United States Patent
Lee et al.

(10) Patent No.: US 7,212,578 B2
(45) Date of Patent: May 1, 2007

(54) TRANSMIT DIVERSITY APPARATUS AND METHOD USING TWO OR MORE ANTENNAS

(75) Inventors: Hyun-Woo Lee, Suwon-shi (KR); Ho Kyu Choi, Seoul (KR); Yong-Jun Kwak, Yongin-shi (KR); Sung-Jin Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 698 days.

(21) Appl. No.: 09/935,553

(22) Filed: Aug. 22, 2001

(65) Prior Publication Data

US 2002/0044591 A1 Apr. 18, 2002

(30) Foreign Application Priority Data

Aug. 22, 2000 (KR) ............... 2000-48722

(51) Int. Cl.
*H04B 7/02* (2006.01)
(52) U.S. Cl. ...................... 375/267; 375/347
(58) Field of Classification Search ........... 375/267, 375/299, 347, 362, 142, 150, 285, 346, 349; 455/62, 69, 63.4, 66.3, 103, 278.1; 370/204
See application file for complete search history.

(56) References Cited

U.S. PATENT DOCUMENTS

| | | | |
|---|---|---|---|
| 5,471,647 A | 11/1995 | Gerlach et al. | 455/63 |
| 5,634,199 A | 5/1997 | Gerlach et al. | 455/63 |
| 6,317,411 B1 * | 11/2001 | Whinnett et al. | 370/204 |

(Continued)

FOREIGN PATENT DOCUMENTS

WO  WO 99/23766  5/1999

(Continued)

OTHER PUBLICATIONS

George Jongren et al., Combining Transmit Antenna Weights and Orthogonal Space-Time Block Codes by Utilizing Side Information, 1999 Asilomar Conference on Signals, Systems, and Computers, Oct. 24, 1999.

(Continued)

*Primary Examiner*—Khanh Tran
(74) *Attorney, Agent, or Firm*—The Farrell Law Firm

(57) ABSTRACT

A transmit diversity system having at least four antennas. A first adder adds a first spread signal obtained by spreading a first symbol pattern with a first orthogonal code to a second spread signal obtained by spreading the first symbol pattern with a second orthogonal code, and transmits the added signal through a first antenna. A second adder adds the first spread signal to a third spread signal obtained by spreading an inverted symbol pattern of the first symbol pattern with the second orthogonal code, and transmits the added signal through a second antenna. A third adder adds a fourth spread signal obtained by spreading a second symbol pattern with the first orthogonal code to a fifth spread signal obtained by spreading the second symbol pattern with the second orthogonal code, and transmits the added signal through a third antenna. A fourth adder adds the fourth spread signal to a sixth spread signal obtained by spreading an inverted symbol of the second symbol pattern with the second orthogonal code, and transmits the added signal through a fourth antenna.

13 Claims, 11 Drawing Sheets

U.S. PATENT DOCUMENTS 6,542,556 B1 * 4/2003 Kuchi et al. ............ 375/299
6,647,078 B1 * 11/2003 Thomas et al. .......... 375/349
6,967,992 B1 * 11/2005 Rabaeijs et al. ......... 375/150

FOREIGN PATENT DOCUMENTS

| WO | WO 00/51265 | 8/2000 |
|---|---|---|
| WO | WO 01/91318 | 11/2001 |

OTHER PUBLICATIONS

Dinesh Rajan et al., "Transmit Diversity Schemes for CDMA-2000", IEEE Wireless Communications and Networking Conference, Sep. 1999.

3GPP: "3rd Generation Partnership Project; Technical Specification Group Radio Access Network; Tx diversity solutions for multiple antennas (Release 5)", Jun. 2001.

Motorola France: "Extended STTD with Switching for Open Loop Transmit Diversity for more than 2 Antennas", Feb. 22, 1999.

* cited by examiner

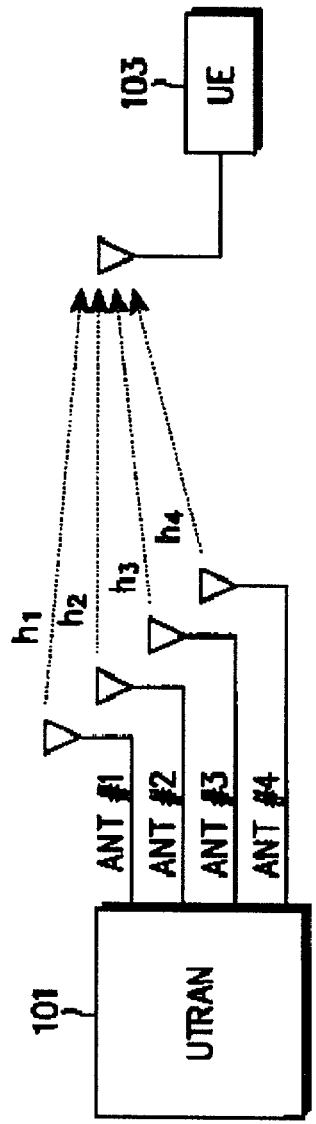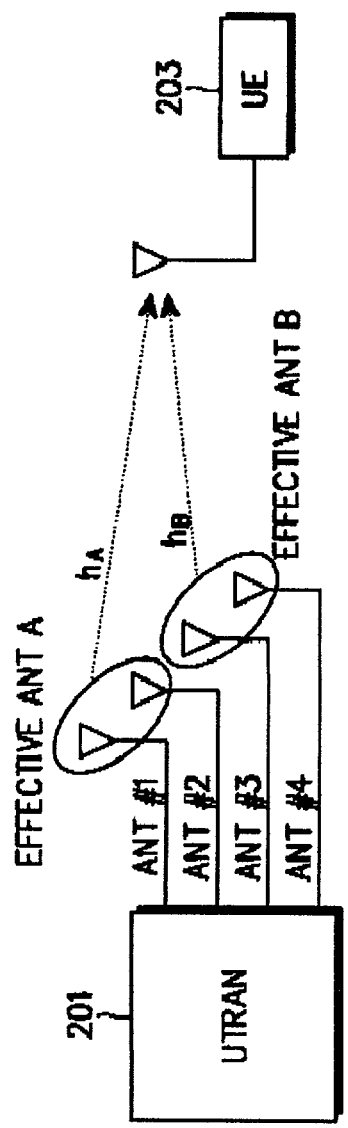

TRANSMIT DIVERSITY APPARATUS AND METHOD USING TWO OR MORE ANTENNAS

PRIORITY

This application claims priority to an application entitled "Transmit Diversity Apparatus and Method Using Two or More Antennas" filed in the Korean Industrial Property Office on Aug. 22, 2000 and assigned Serial No. 2000-48722, the contents of which are hereby incorporated by reference.

BACKGROUND OF THE INVENTION

1. Field of the Invention

The present invention relates generally to a transmit diversity system, and in particular, to a system in which a UTRAN supporting an N-antenna transmission diversity scheme is compatible with a UE for providing an M-antenna transmit diversity system.

2. Description of the Related Art

As mobile telecommunication technology progresses rapidly resulting in an increase of the amount of service data that can be accommodated, a $3^{rd}$ generation mobile telecommunication system has been developed for high-speed data transmission. The $3^{rd}$ generation mobile telecommunication system has been separately standardized into an asynchronous W-CDMA (Wideband Code Division Multiple Access) or UMTS (Universal Mobile Telecommunication System) system in Europe and a synchronous CDMA-2000 system in North America. Such a mobile telecommunication system is generally configured such that a plurality of UEs (User Equipments) communicate with one another through one UTRAN (UMTS Terrestrial Radio Access Network). In the mobile telecommunication system, a received signal is subject to phase distortion due to fading which occurs in a radio channel during high-speed data transmission. The fading causes attenuation in amplitude of the received signal from several dB to several tens of dB. If not properly compensated for during data demodulation, the phase of the received signal, distorted by the fading, becomes a cause of an information error on the data transmitted from a transmission side, decreasing the quality of service (QoS) of the mobile telecommunication system. In order to transmit the high-speed data without deterioration of the service quality, the mobile telecommunication system must resolve the fading problem and to do so, employs various diversity techniques.

In general, the CDMA system adopts a Rake receiver, which performs diversity receiving using delay spread of a channel. Although the Rake receiver performs receive diversity for receiving a multi-path signal, a diversity technique using the above-stated delay spread does not operate desirably when the delay spread is less than a preset value. In addition, a time diversity technique using interleaving and coding is used in a Doppler spread channel. However, it is difficult to use the time diversity technique in a low-speed Doppler spread channel.

Therefore, in order to resolve the fading problem, a space diversity technique is used in a low-delay spread channel such as an indoor channel and in a low-speed Doppler spread channel such as a pedestrian channel. The space diversity technique uses two or more transmit/receive antennas. That is, when a signal transmitted through one antenna is attenuated due to the fading, the space diversity technique receives a signal transmitted through another antenna. The space diversity can be classified into a receive diversity technique using a receive antenna and a transmit diversity technique using a transmit antenna. Although the receive diversity technique is applied to the UE, it is difficult to mount a plurality of antennas on the UE, taking into account the size and cost of the UE. Therefore, it is recommended to use the transmit diversity technique in which a plurality of antennas are mounted on the UTRAN.

The transmit diversity technique relates to an algorithm for obtaining a diversity gain by receiving a downlink signal, and is divided into an open loop mode and a closed loop mode. In the open loop mode, the UTRAN transmits a data signal through the diversity antennas after encoding, and the UE then receives the signal transmitted from the UTRAN and decodes the received signal, thereby obtaining a diversity gain. In the closed loop mode, (1) the UE predicts channel environments to which the signals transmitted through the respective transmission antennas of the UTRAN will be subjected, (2) the UE calculates weights that are proper to maximize power of the received signals, for the antennas of the UTRAN depending on the predicted values and transmits information on the calculated weights to the UTRAN through an uplink and (3) the UTRAN then controls weights of the respective antennas based on the weight information transmitted from the UE. For channel measurement of the UE, the UTRAN transmits pilot signals assigned to the respective antennas, and the UE measures the channels through the pilot signals and determines optimal weights using this channel information.

U.S. Pat. No. 5,634,199, entitled "Method of Subspace Beamforming Using Adaptive Transmitting Antennas with Feedback" and U.S. Pat. No. 5,471,647, entitled "Method for Minimizing Cross-talk in Adaptive Antennas", disclose a method for using the transmit diversity technique in a feedback mode. U.S. Pat. No. 5,634,199 discloses a channel measurement and feedback method using a perturbation algorithm and a gain matrix. However, this method, being a blind algorithm, is not used often since it has a low conversion speed for channel measurement and has a difficulty in finding correct weights.

Meanwhile, UMTS, i.e., W-CDMA (3GPP ($3^{rd}$ Generation Partnership Project)) Release 99 recommends a method for quantizing weights of two antennas and feeding back the quantized weights. This method refers to a case where there exists only the UE supporting two-antenna transmit diversity techniques. That is, the W-CDMA Release 99 does not mention a transmission method for the case where the UTRAN has four transmit antennas, nor a UTRAN signal transmission method and a signal reception method of the UE, considering the case where there coexists one UE employing two-antenna transmit diversity techniques and another UE employing four-antenna transmit diversity techniques. If the transmit antennas are expanded to four in number using a method for expanding the conventional method for transmitting a signal through a single antenna to a method for transmitting a signal through two transmit antennas, the UE employing the two-antenna transmit diversity techniques will not operate normally. If one method for transmitting a signal with two antennas and another method for transmitting a signal with four antennas are both used to resolve the above-stated problem, a new problem of power imbalance between the antennas will arise.

A method for transmitting different pilot signals through a plurality of antennas includes a time division multiplexing (TDM) system, a frequency division multiplexing (FDM) system and a code division multiplexing (CDM) system. To transmit the different pilot signals through the antennas, the W-CDMA system can use scrambling codes, channelization codes or orthogonal pilot symbol patterns.

In general, the system using two transmit antennas can obtain a considerably high diversity gain and a signal-to-noise ratio (SNR) of up to 3 dB, compared with existing systems using a single antenna. In addition, when the transmit diversity technique uses more than two antennas, the diversity gain increases to a level higher than the diversity gain obtainable by the two-antenna transmit diversity technique, and the SNR also increases in proportion to the number of antennas. Here, the increased diversity gain is relatively lower than the diversity gain obtained by the two-antenna diversity technique, but a diversity degree increases so that an increase in the signal-to-noise ratio (Eb/No) causes an increase in the diversity gain.

The W-CDMA Release 99 for the UMTS system currently discloses a transmit diversity technique using only two antennas. However, the W-CDMA Release 99 considers a necessity of a transmit diversity technology using more than two antennas. That is, it must consider a mobile communication system in which there coexists an existing UE receiving signals transmitted from two transmit antennas and a UE receiving signals transmitted from more than two transmit antennas. In this case, a transceiver is required which is structured such that the UE using two-antenna transmit diversity technique and the UE using the more-than-two-antenna transmit diversity technique can normally receive signals from the UTRAN. That is, a transmitting/receiving method and apparatus must be considered, which operates normally even when the UE designed to accommodate a UTRAN system employing the two-antenna transmit diversity technique is located in a service area of a UTRAN system employing the more-than-two-antenna transmit diversity technique. On the other hand, a transmitting/receiving method and apparatus must be also considered, which operates normally even when the UE designed to accommodate the UTRAN system employing the more-than-two-antenna transmit diversity technique is located in a service area of the UTRAN system employing the two-antenna transmit diversity technique. In addition, it is necessary to provide compatibility with the UE designed to accommodate the UTRAN system employing the transmit diversity technique using more than two antennas, without modification of the UE designed to accommodate the UTRAN system employing the two-antenna transmit diversity technique.

Compatibility is especially required in the common pilot channel, and a common channel for transmitting common data. This is because although a dedicated channel may transmit signals in a proper diversity method depending upon the characteristic and version of the UE, a common pilot channel (CPICH) and a common data channel, which are common channels, must be constructed so as to support both a lower-version UE operating in the UTRAN system employing the existing two-antenna transmit diversity technique and an upper-version UE operating in the UTRAN system employing the more-than-two-antenna transmit diversity technique. That is, the common channels must have higher reliability for the signals transmitted by the system, compared with the dedicated channel, so that the common channels transmit the signals at higher power compared with the dedicated channel. Therefore, it is possible to perform communication at lower transmission power by obtaining a transmit diversity gain from the common channels, thereby increasing an overall system capacity, i.e., the number of subscribers.

The transmit antenna system is a system which transmits signals with a plurality of antennas. A transmission RF system including an antenna power amplifier, e.g., a low noise amplifier (LNA) is advantageous in terms of cost and efficiency, when power of the signals transmitted through a plurality of antennas is uniformly distributed. If the transmission power is non-uniformly distributed to a specific antenna, it is difficult to design the antenna and the cost increases undesirably. It is difficult to provide the compatibility with the method and apparatus employing the two-antenna transmit diversity technique, if the transmission/reception system is not efficiently designed.

SUMMARY OF THE INVENTION

It is, therefore, an object of the present invention to provide a method and apparatus for transmitting a signal in a UTRAN employing a more-than-two-antenna transmit diversity technique.

It is another object of the present invention to provide a method and apparatus for receiving a signal in a UE which receives signals transmitted from a UTRAN employing a more-than-two-antenna transmit diversity technique.

It is further another object of the present invention to provide a method and apparatus for transmitting a pilot signal in a system employing a transmit diversity technique using a different number of antennas.

It is yet another object of the present invention to provide a method and apparatus for receiving a pilot signal in a system employing a transmit diversity technique using a different number of antennas.

It is still another object of the present invention to provide a method and apparatus for transmitting a pilot signal in a system employing a transmit diversity technique using antennas, the number of which is a multiple of four, by separating an orthogonal code and a scrambling code.

It is still another object of the present invention to provide a method and apparatus for receiving a pilot signal in a system employing a transmit diversity technique using antennas, the number of which is a multiple of four, by separating an orthogonal code and a scrambling code.

It is still another object of the present invention to provide a method and apparatus for transmitting a pilot signal in a system employing a transmit diversity technique using various numbers of antennas by limiting signal transmission through a specific antenna in a transmit diversity system having antennas, the number of which is a multiple of four.

It is still another object of the present invention to provide a method and apparatus for receiving a pilot signal in a system employing a transmit diversity technique using various numbers of antennas by limiting signal transmission through a specific antenna in a transmit diversity system having antennas, the number of which is a multiple of four.

It is still another object of the present invention to provide a signal transmission method and apparatus for distributing different power to respective antennas in a transmit diversity technique using a plurality of antennas.

To achieve the above and other objects, there is provided a UTRAN transmitter in a mobile communication system having at least four antennas. A first adder adds a first spread signal obtained by spreading a first symbol pattern with a first orthogonal code after transmission power control, to a second spread signal obtained by spreading the first symbol pattern with a second orthogonal code being orthogonal with the first orthogonal code after transmission power control, and transmits the added signal through a first antenna. A second adder adds the first spread signal to a third spread signal obtained by spreading a first inverted symbol pattern obtained by phase-inverting the first symbol pattern with the second orthogonal code after transmission power control, and transmits the added signal through a second antenna. A third adder adds a fourth spread signal obtained by spreading a second symbol pattern being orthogonal with the first symbol pattern with the first orthogonal code after transmission power control, to a fifth spread signal obtained by spreading the second symbol pattern with the second orthogonal code after transmission power control, and transmits the added signal through a third antenna. A fourth adder adds the fourth spread signal to a sixth spread signal obtained by spreading a second inverted symbol pattern obtained by phase-inverting the second symbol pattern with the second orthogonal code after transmission power control, and transmits the added signal through a fourth antenna.

For transmission power control, the UTRAN multiplies the symbol patterns by a gain constant in order to enable receivers for receiving the transmitted signals to have the same cell radius.

Preferably, the symbol pattern is a pilot symbol pattern or a data symbol pattern.

BRIEF DESCRIPTION OF THE DRAWINGS

The above and other objects, features and advantages of the present invention will become more apparent from the following detailed description when taken in conjunction with the accompanying drawings in which:

FIG. 1 illustrates a structure of a general four-antenna transmit diversity system;

FIG. 2 illustrates a structure of a four-antenna transmit diversity system according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 1 illustrates a structure of a general four-antenna transmit diversity system. Referring to FIG. 1, a UTRAN (UMTS Terrestrial Radio Access Network) 101 includes four antennas ANT#1–ANT#4, and transmits a user signal through the four antennas after converting the user signal to be proper for four-antenna transmission. A UE 103 receives a signal transmitted through the first antenna ANT#1 over an $h_1$ channel, a signal transmitted through the second antenna ANT#2 over an $h_2$ channel, a signal transmitted through the third antenna ANT#3 over an $h_3$ channel, and a signal transmitted through the fourth antenna ANT#4 over an $h_4$ channel, respectively. The UE 103 decodes the signals received from the four antennas ANT#1–ANT#4 of the UTRAN 101 into original transmission data through a demodulating process.

FIG. 2 illustrates a structure of a four-antenna transmit diversity system according to an embodiment of the present invention, wherein a UE supporting the two-antenna transmit diversity technique receives four pilot signals transmitted from a UTRAN. Referring to FIG. 2, a UE 203 supporting the two-antenna transmit diversity technique receives the pilot signals from the four antennas of a UTRAN 201 in such a manner that it receives the pilot signals effectively from two antennas. Specifically, the UE 203 receives a pilot signal transmitted through first and second antennas ANT#1 and ANT#2 of the UTRAN 201 over an $h_A$ channel, and receives a pilot signal transmitted through third and fourth antennas ANT#3 and ANT#4 over an $h_B$ channel.

Figure 3:
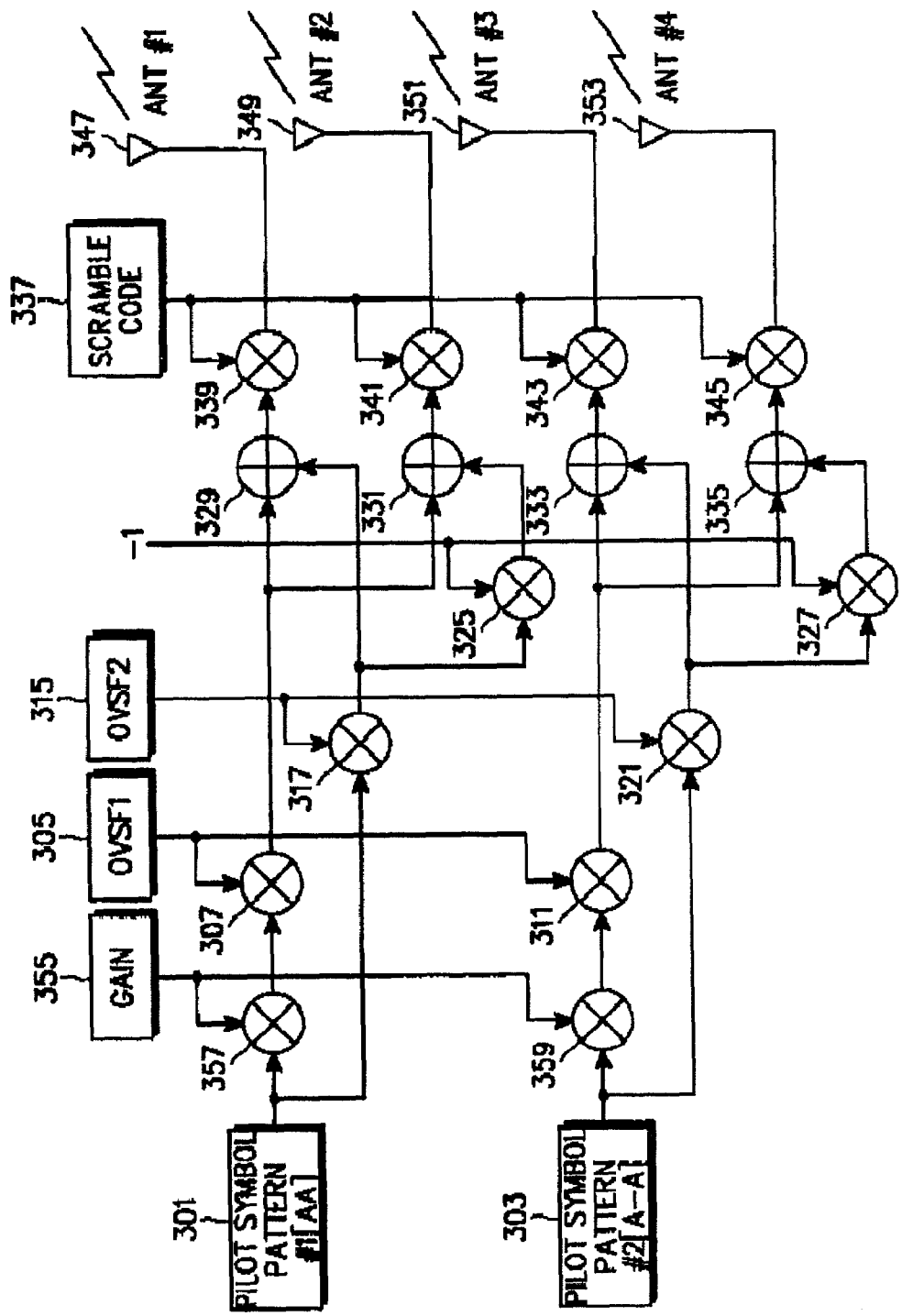
FIG. 3 illustrates a structure of a transmit diversity transmitter for transmitting a pilot signal according to an embodiment of the present invention.

In the case where the UE supporting the two-antenna transmit diversity technique exists in a service area of the UTRAN supporting the four-antenna transmit diversity technique as shown in FIG. 2, a transmitter of the UTRAN 201 employing the four-antenna transmit diversity has the structure shown in FIG. 3.

FIG. 3 illustrates a structure of a transmit diversity transmitter for transmitting a pilot signal according to an embodiment of the present invention. The pilot signals output from four antennas shown in FIG. 3 can be represented by Equations (1) to (4), respectively. That is, Equation (1) represents an output $x_1(t)$ of a first antenna 347, and Equation (2) represents an output $x_2(t)$ of a second antenna 349. Further, Equation (3) represents an output $x_3(t)$ of a third antenna 351, and Equation (4) represents output $x_4(t)$ of a fourth antenna 353.

$$x_1(t)=p_1(t)\times(g\cdot C_{OVSF1}(t)+C_{OVSF2}(t))\times C_{SC}(t) \quad (1)$$

$$x_2(t)=p_1(t)\times(g\cdot C_{OVSF1}(t)-C_{OVSF2}(t))\times C_{SC}(t) \quad (2)$$

$$x_3(t)=p_2(t)\times(g\cdot C_{OVSF1}(t)+C_{OVSF2}(t))\times C_{SC}(t) \quad (3)$$

$$x_4(t)=p_2(t)\times(g\cdot C_{OVSF1}(t)-C_{OVSF2}(t))\times C_{SC}(t) \quad (4)$$

In Equations (1) to (4), $p_1(t)$ indicates a pilot symbol pattern 301 in the form of AA which is a first symbol pattern, and $p_2(t)$ indicates a pilot symbol pattern 303 n the form of A-A or -AA which is a second symbol pattern. The first symbol pattern in the form of AA is orthogonal with the second symbol pattern in the form of A-A or -AA, so that an orthogonal property between the pilot symbol pattern 301 and the pilot symbol pattern 303 is maintained. Further, $C_{OVSF1}(t)$ and $C_{OVSF2}(t)$ indicate a first orthogonal code OVSF1 (305) and a second orthogonal code OVSF2 (315), respectively, which are Walsh codes or OVSF (Orthogonal Variable Spreading Factor) codes for spreading the pilot symbol patterns 301 and 303. In addition, $C_{SC}(t)$ indicates a scrambling code 337 having the same chip rate as that of the orthogonal codes 305 and 315. Finally, 'g' indicates a gain constant 355 used to guarantee performance of the UE supporting the existing two-antenna transmit diversity technique.

A pilot signal 'A' to be transmitted by the UTRAN 201 through the antennas may have a value of 1 or −1, when it is applied to a BPSK (Binary Phase Shift Keying) transmitter, or may have a value of 1+j, when it is applied to a QPSK (Quadrature Phase Shift Keying) transmitter. Accordingly, the first pilot symbol pattern 301 in the form of AA is multiplied by the gain constant 355 by a multiplier 357 and then multiplied by the first orthogonal code OVSF1 (305) by a multiplier 307, and the resulting value is provided to an adder 329. For example, the first orthogonal code OVS1 has a length of 256 chips. Further, the first pilot symbol pattern 301 is multiplied by the second orthogonal code OVSF2 by a multiplier 317, and then provided to the adder 329. The adder 329 adds the output of the multiplier 307 to the output of the multiplier 317 and provides its output to a multiplier 339. The output of the adder 329 is multiplied by the scrambling code 337 by the multiplier 339 and then transmitted through the first antenna 347. Further, the first pilot symbol pattern 301 is multiplied by the gain constant 355 by the multiplier 357 and then multiplied by the first orthogonal code OVSF1 (305) by the multiplier 307, and the resulting value is provided to an adder 331. Further, the first pilot symbol pattern 301 is multiplied by the second orthogonal code OVSF2 (315) by the multiplier 317 and then multiplied by a signal of −1 by a multiplier 325 for signal inversion, and the resulting value is provided to the adder 331. The adder 331 adds the output of the multiplier 307 to the output of the multiplier 325 and provides its output to a multiplier 341. The output of the adder 331 is multiplied by the scrambling code 337 by the multiplier 341 and then transmitted through the second antenna 349. Although the multiplier 325 multiplies the input signal by the signal of −1 for phase inversion, the phase inversion of the input signal can be performed at either an input stage or an output stage of the UTRAN transmitter.

Similarly, the second pilot symbol pattern 303 in the form of A-A or -AA is multiplied by the gain constant 355 by a multiplier 359 and then multiplied by the first orthogonal code OVS1 (305) by a multiplier 311, and the resulting value is provided to an adder 333. Further, the second pilot symbol pattern 303 is multiplied by the second orthogonal code OVSF2 by a multiplier 321, and then, provided to the adder 333. The adder 333 adds the output of the multiplier 311 to the output of the multiplier 321 and provides its output to a multiplier 343. The output of the adder 333 is multiplied by the scrambling code 337 by the multiplier 343 and then transmitted through the third antenna 351. Further, the second pilot symbol pattern 303 is multiplied by the gain constant 355 by the multiplier 359 and then multiplied by the first orthogonal code OVS1 (305) by the multiplier 311, and the resulting value is provided to an adder 335. Further, the second pilot symbol pattern 303 is multiplied by the second orthogonal code OVSF2 (315) by the multiplier 321 and then multiplied by the signal of −1 by a multiplier 327 for signal inversion, and the resulting value is provided to the adder 335. The adder 335 adds the output of the multiplier 311 to the output of the multiplier 327 and provides its output to a multiplier 345. The output of the adder 335 is multiplied by the scrambling code 337 by the multiplier 345 and then transmitted through the fourth antenna 353. Although the multiplier 327 multiplies the input signal by the signal of −1 for phase inversion, the phase inversion of the input signal can be performed at either an input stage or an output stage of the UTRAN transmitter as described with reference to the multiplier 325. The adders 329, 331, 333 and 335 in the transmitter can be united into a single adder. In addition, the multipliers 339, 341, 343 and 345 for multiplying their input signals by the scrambling code 337 can also be united into a single multiplier, and can also perform complex spreading. The multipliers 325 and 327 for inverting their input signals by multiplying them by the signal of −1 can be put in other places as long as the signals to be output through the second and fourth antennas 349 and 353 are subjected to phase inversion. For example, the multiplier 325 can be arranged in front of the multiplier 317 to inverse the input pilot symbol pattern 301 or the input OVSF code 315. In addition, it is also possible to remove the multiplier 325. In this case, the adder 331 must subtract the output signal of the multiplier 317 from the output signal of the multiplier 307. In the same manner, the multiplier 327 can be arranged in front of the multiplier 321 to inverse the input pilot symbol pattern 303 or the input OVSF code 315. In addition, it is also possible to remove the multiplier 327. In this case, the adder 335 must subtract the output signal of the multiplier 321 from the output signal of the multiplier 311. If the gain constant 355 is g=1, it is not included in the hardware structure. In addition, the gain constant 355 has a constant value or a variable value which can be adaptively controlled according to a channel environment or a user environment in a preset unit (e.g., symbol unit, slot unit or frame unit).

Figure 4:
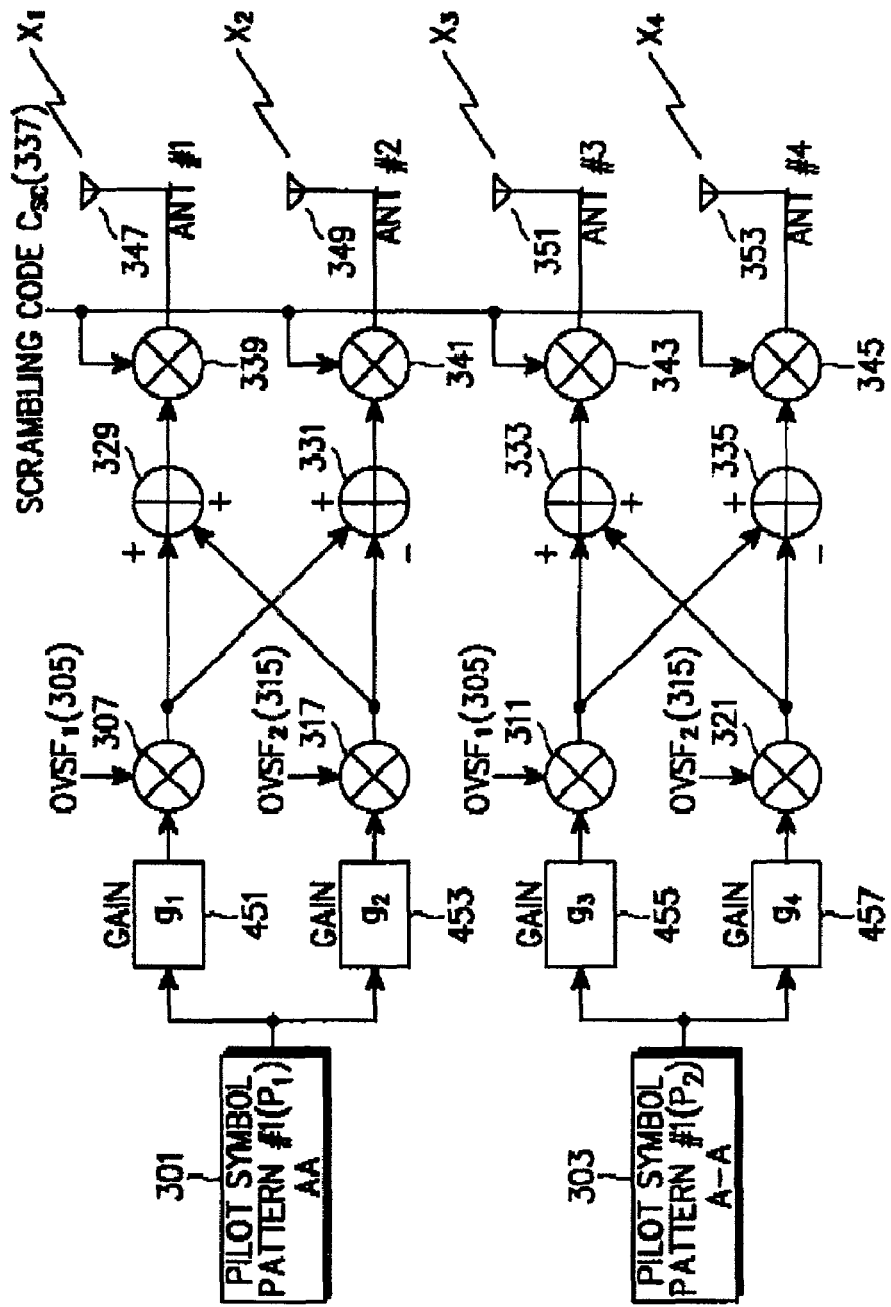
FIG. 4 illustrates a structure of a transmit diversity transmitter for pilot gain-controlled transmission according to another embodiment of the present invention.

FIG. 4 illustrates a structure of a transmit diversity transmitter for pilot gain-controlled transmission according to another embodiment of the present invention, wherein the pilot signals of the respective antennas are transmitted at different transmission power.

A method for controlling transmission power, i.e., gain of the pilot signals transmitted through the respective antennas will be described with reference to FIG. 4. The reason for controlling transmission power of the pilot signals transmitted through the respective antennas is to control the cell radii of the respective receivers for receiving the pilot signals to be identical. Here, "controlling the cell radii of the respective receivers to be identical" refers to controlling the cell radii for the pilot signals to be identical regarding a receiver employing a 1-antenna transmit diversity technique, a receiver employing a two-antenna transmit diversity technique, a receiver employing a four-antenna transmit diversity technique and a receiver employing a transmit diversity technique having a different number of antennas.

Referring to FIG. 4, when the UTRAN 201 outputs the pilot signals having the same transmission power, a signal transmitted through a first antenna 347 is multiplied by a gain constant g1 (451), a signal transmitted through a second antenna 349 is multiplied by a gain constant g2 (453), a signal transmitted through a third antenna 351 is multiplied by a gain constant g3 (455) and a signal transmitted through a fourth antenna 353 is multiplied by a gain constant g4 (457). The method for controlling transmission power, i.e., gains of the antennas by multiplying the signals transmitted through the respective antennas by the gain constants corresponding to the respective antennas can be applied not only to the pilot signals but also to common data signals which will be described later. In addition, the method can be applied to any signal transmitted in the system employing the transmit diversity technique using a plurality of antennas, when it is necessary to independently control the gains of the antennas.

The transmitter structure employing the four-antenna transmit diversity technique has been described with reference to FIGS. 3 and 4. Next, a transmitter structure supporting an eight-antenna transmit diversity technique will be described with reference to FIG. 5.

Figure 5:
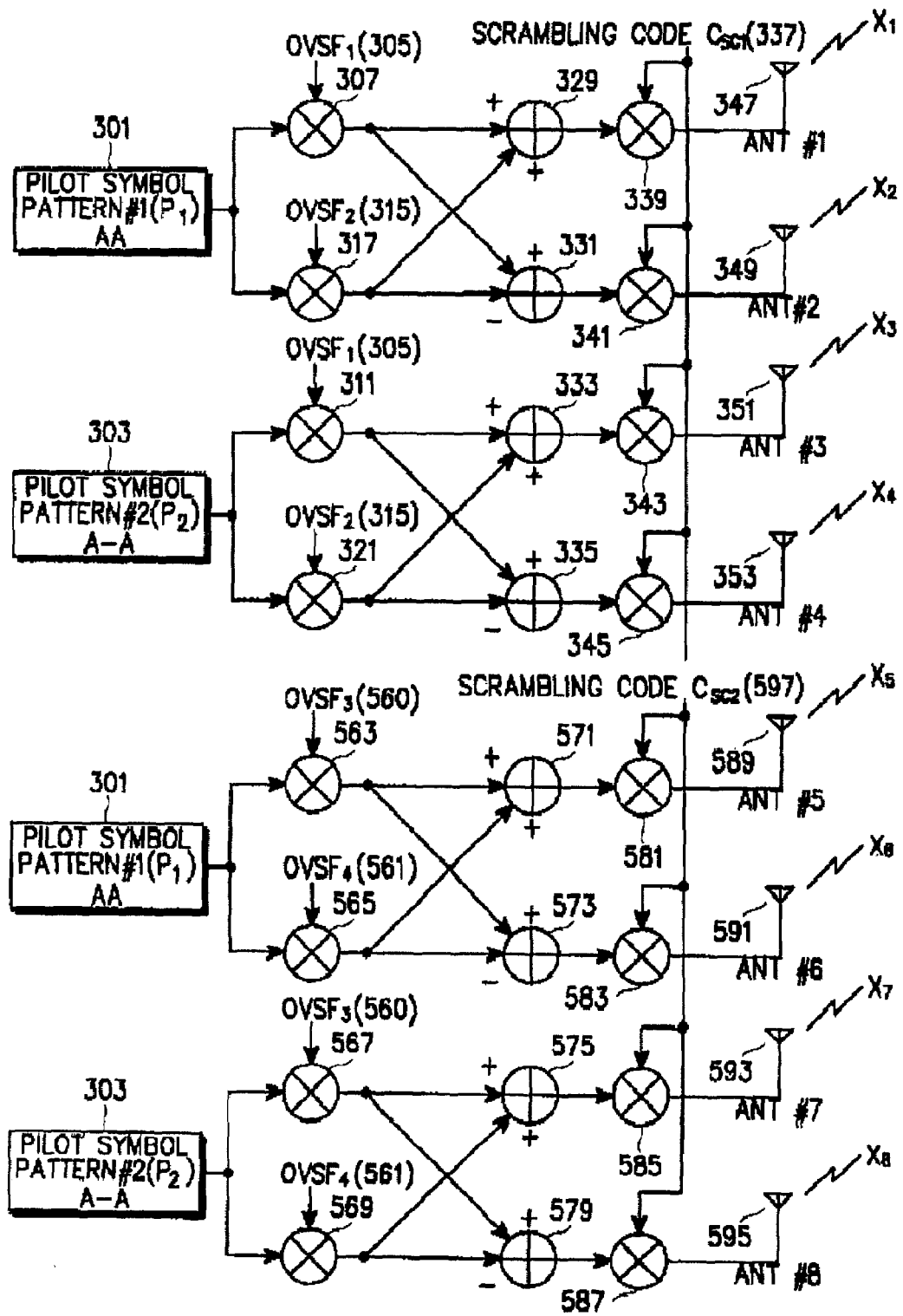
FIG. 5 illustrates a structure of an eight-antenna transmit diversity transmitter for transmitting a pilot signal according to another embodiment of the present invention.

FIG. 5 illustrates a structure of an eight-antenna transmit diversity transmitter for transmitting a pilot signal according to another embodiment of the present invention, wherein the structures used for the four-antenna transmit diversity are arranged twice in parallel to implement the eight-antenna transmit diversity. Referring to FIG. 5, a method for transmitting pilot signals through first to fourth antennas 347, 349, 351 and 353 is identical to the four-antenna transmit diversity method described with reference to FIG. 3, so the detailed description will not be made. Although a scrambling code $C_{SC1}$ is represented differently from the scrambling code $C_{SC}$ shown in FIGS. 3 and 4, it should be noted that they are the same scrambling codes. That is, since the four-antenna transmit diversity technique is expanded to an eight-antenna transmit diversity technique, the scrambling code applied to the first to fourth antennas 347, 349, 351 and 353 is represented by $C_{SC1}$, while the scrambling codes applied to fifth to eighth antennas 589, 591, 593 and 595 is represented by $C_{SC2}$. For simplicity, FIG. 5 does not show a gain control process for separately controlling transmission power of the antennas and a process for independently multiplying the pilot signals by the gain constants of the antennas.

As stated above, the eight-antenna transmit diversity technique can be implemented by doubling the four-antenna transmit diversity. This can be achieved by further assigning two new orthogonal codes, i.e., a third orthogonal code OVSF3 (560) and a fourth orthogonal code OVSF4 (561) for the pilot signals of the four additional antennas in addition to the first orthogonal code OVSF1 (305) and the second orthogonal code OVSF2 (315) applied to the first to fourth antennas 347, 349, 351 and 353, or by further assigning a new scrambling code $C_{SC2}$ (597) in addition to the scrambling code $C_{SC1}$ (337) applied to the first to fourth antennas 347, 349, 351 and 353 and then applying the first and second orthogonal codes OVSF1 and OVSF2, instead of the third and fourth orthogonal codes OVSF3 and OVSF4, to the first to fourth antennas 347, 349, 351 and 353. If the scrambling code $C_{SC1}$ (337) is not identical to the scrambling code $C_{SC2}$ (597), the first orthogonal code OVSF1 (305) is identical to the third orthogonal code OVSF3 (560) and the second orthogonal code OVSF2 (315) is also identical to the fourth orthogonal code OVSF4 (561). In contrast, if the first orthogonal code OVSF1 (305) is not identical to the third orthogonal code OVSF3 (560) and the second orthogonal code OVSF2 (315) is not identical to the fourth orthogonal code OVSF4 (561), then the scrambling code $C_{SC1}$ (337) is identical to the scrambling code $C_{SC2}$ (597). By applying the different codes to the antennas in this way, it is possible to apply the transmit diversity technique to the fifth to eighth antennas 589, 591, 593 and 595, thus making it possible to expand the number of antennas to which the transmit diversity technique is applied. In addition, the number of antennas to which the transmit diversity technique is applied can be expanded in analogous manner by a multiple of four. When the number of antennas increases by four, the number of the required orthogonal codes also increases by two or one new scrambling code is additionally used.

Of course, even in the case where the number of antennas used by the transmit diversity technique is not a multiple of four, it is possible to implement the invention by modifying the method for expanding the number of antennas to a multiple of four. For example, when the transmit diversity uses three antennas, it is possible to implement the three-antenna transmit diversity by not transmitting the signal output from the last antenna, i.e., the fourth antenna 353 in the above-stated four-antenna transmit diversity technique. As another example, when the transmit diversity uses six antennas, it is possible to implement the six-antenna transmit diversity technique by not transmitting the signals output from the sixth and eighth antennas 591 and 595 in the eight-antenna transmit diversity technique.

Figure 6:
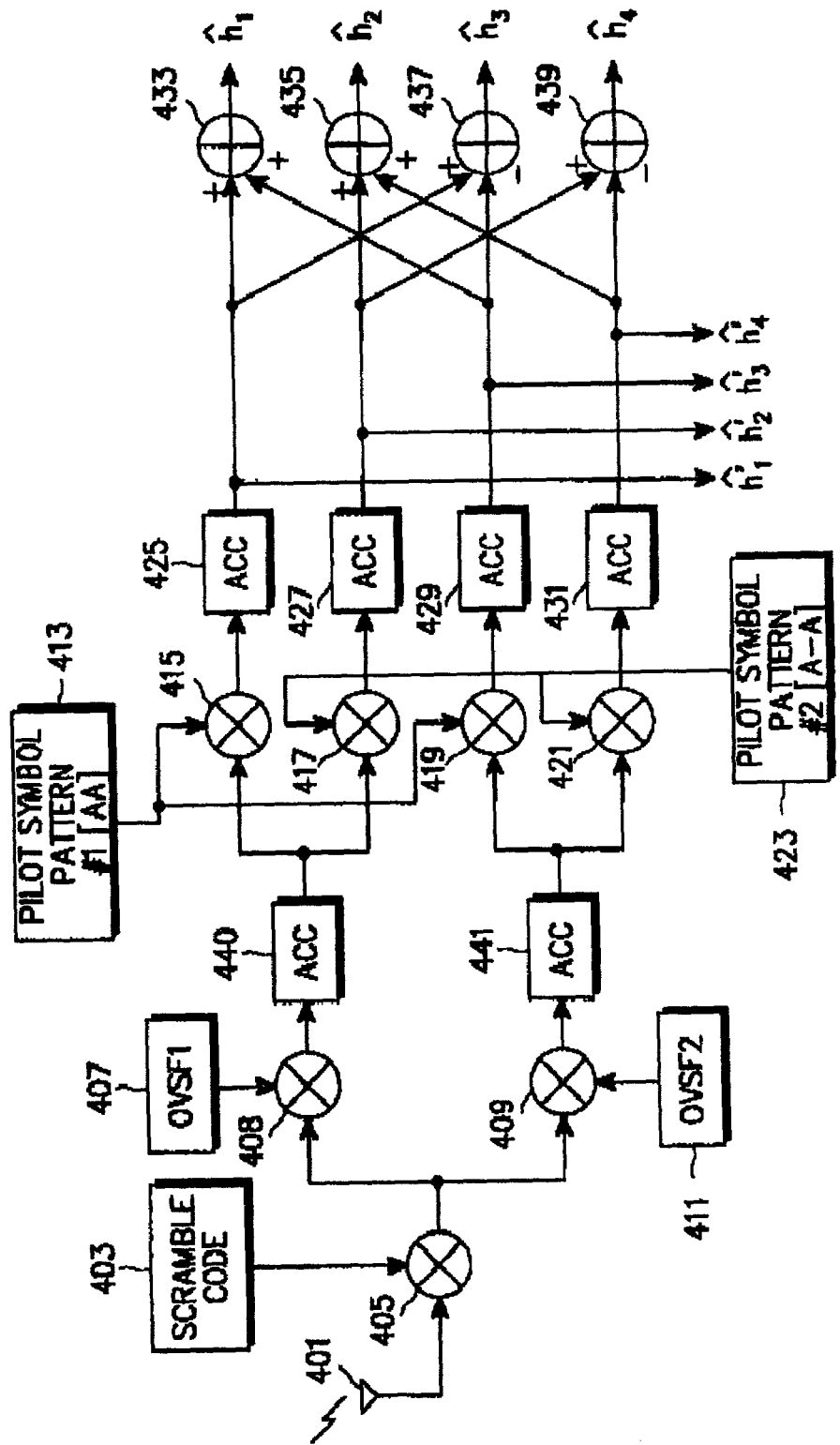
FIG. 6 illustrates a structure of a transmit diversity receiver for pilot estimation according to another embodiment of the present invention.

Next, a structure of a UE receiver corresponding to the UTRAN transmitter shown in FIG. 3 will be described with reference to FIG. 6. FIG. 6 illustrates a structure of a transmit diversity receiver for estimating a pilot signal according to an embodiment of the present invention. Four output signals shown in FIG. 6 can be represented by Equations (5) to (8) below. Specifically, Equation (5) represents a channel measurement value $\hat{h}_1$ of the first antenna 347, and Equation (6) represents a channel measurement value $\hat{h}_2$ of the second antenna 349. Further, Equation (7) represents a channel measurement value $\hat{h}_3$ of the third antenna 351, and Equation (8) represents a channel measurement value $\hat{h}_4$ of the fourth antenna 353.

$$\hat{h}_1 = \int r(t) \cdot C_{SC}(t) \cdot C_{OVSF1}(t) \{p_1(t) + p_2(t)\} dt \qquad (5)$$

$$\hat{h}_2 = \int r(t) \cdot C_{SC}(t) \cdot C_{OVSF1}(t) \{p_1(t) - p_2(t)\} dt \qquad (6)$$

$$\hat{h}_3 = \int r(t) \cdot C_{SC}(t) \cdot C_{OVSF2}(t) \{p_1(t) + p_2(t)\} dt \qquad (7)$$

$$\hat{h}_4 = \int r(t) \cdot C_{SC}(t) \cdot C_{OVSF2}(t) \{p_1(t) - p_2(t)\} dt \qquad (8)$$

In Equations (5) to (8), r(t) indicates a signal received at the UE 203 through an antenna 401, $p_1(t)$ indicates a first pilot symbol pattern 413, and $p_2(t)$ indicates a second pilot symbol pattern 423 which is orthogonal with the first pilot symbol pattern 413. In addition, $C_{OVSF1}(t)$ indicates a first orthogonal code OVSF1 (407), $C_{OVSF2}(t)$ indicates a second orthogonal code OVSF2 (411), and $C_{SC}(t)$ indicates a scrambling code 403. The pilot symbol patterns, the orthogonal codes and the scrambling code are identical to those used in the UTRAN and are pre-stored in the UE.

The signal r(t) received through the antenna 401 of the UE 203 is provided to a despreader 405 after it is converted to a baseband signal, and then, despread in despreader 405 with the scrambling code 403. The signal despread by the despreader 405 is provided both to an orthogonal despreader 408 and an orthogonal despreader 409. The orthogonal despreader 408 despreads the signal output from the despreader 405 using the first orthogonal code OVSF1 (407) and the orthogonal despreader 409 despreads the signal output from the despreader 405 using the second orthogonal code OVSF2 (411). The signal despread with the first orthogonal code OVSF1, output from the orthogonal despreader 408, is accumulated by an accumulator (ACC) 440 in a symbol unit. The output signal of the accumulator 440 is multiplied by the first pilot symbol pattern 413 by a multiplier 415, and then accumulated by an accumulator 425. Further, the output signal of the accumulator 440 is multiplied by the second pilot symbol pattern 423 by a multiplier 417, and then accumulated by an accumulator 427.

In addition, the signal despread with the second orthogonal code OVSF2, output from the orthogonal despreader 409, is accumulated by an accumulator 441 in a symbol unit. The output signal of the accumulator 441 is multiplied by the first pilot symbol pattern 413 by a multiplier 419, and then accumulated by an accumulator 429. Further, the output signal of the accumulator 441 is multiplied by the second pilot symbol pattern 423 by a multiplier 421, and then accumulated by an accumulator 431.

The output signal of the accumulator 425 is added to the output signal of the accumulator 429 by an adder 433, and is output as the pilot symbol pattern signal transmitted through the first antenna 347 of the UTRAN. The output signal of the accumulator 427 is added to the output signal of the accumulator 431 by an adder 435, and is output as the pilot symbol pattern signal transmitted through the second antenna 349 of the UTRAN. The output signal of the accumulator 429 is subtracted from the output signal of the accumulator 425 by an adder 437, and is output as the pilot symbol pattern signal transmitted through the third antenna 351 of the UTRAN. The output signal of the accumulator 431 is subtracted from the output signal of the accumulator 427 by an adder 439, and is output as the pilot symbol pattern signal transmitted through the fourth antenna 353 of the UTRAN.

When the transmitter independently controls the transmission power of the respective antennas using the associated gain constants as shown in FIG. 4, the receiver is required to control the transmission power of the respective antennas according to the associated gain constants. A receiver structure for performing gain control for the transmission power control will be described with reference to FIG. 7.

Figure 7:
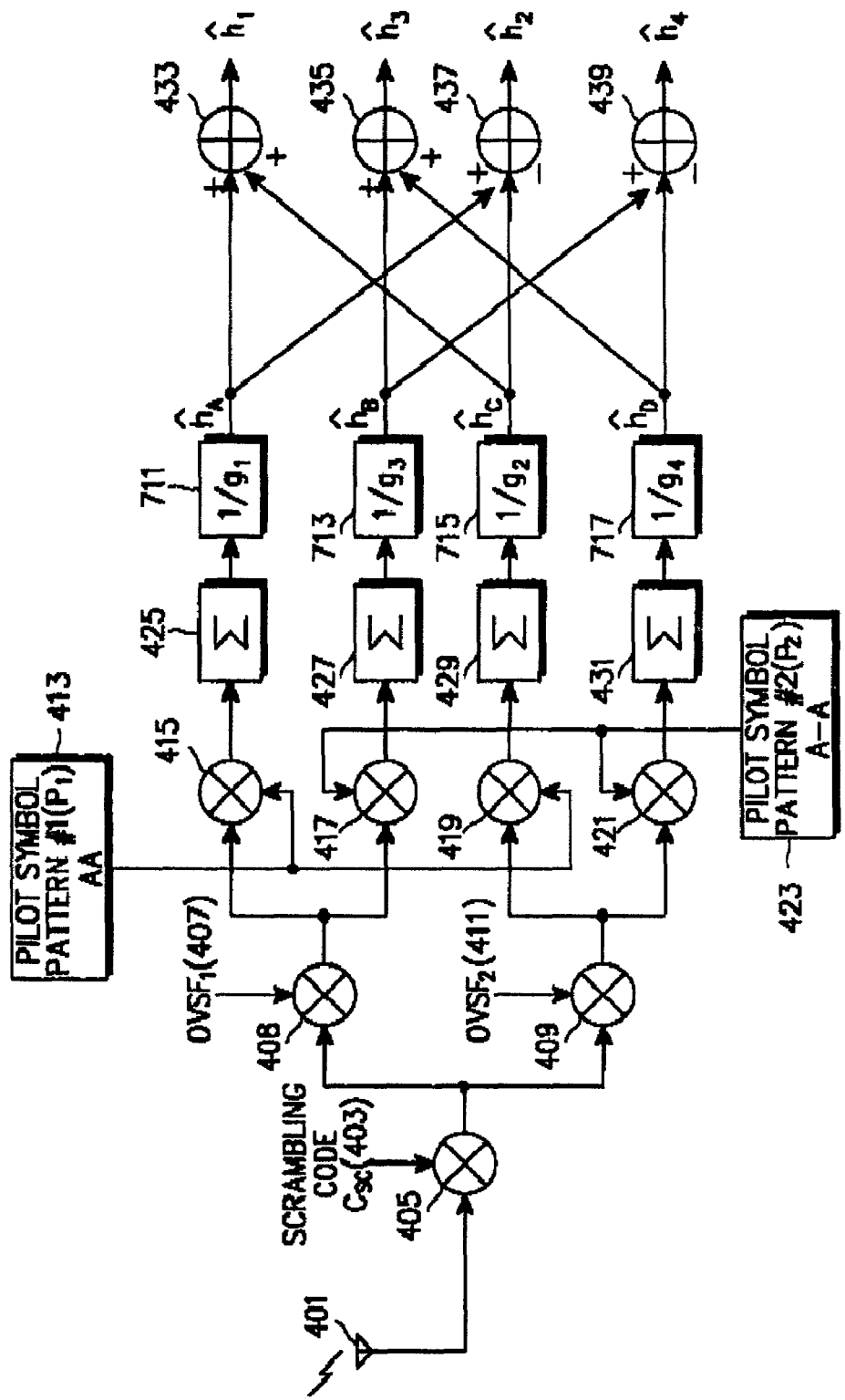
FIG. 7 illustrates a structure of a transmit diversity receiver for pilot gain-controlled estimation according to another embodiment of the present invention.

FIG. 7 illustrates a structure of a transmit diversity receiver for pilot gain-controlled estimation according to another embodiment of the present invention, wherein if the signals transmitted through the respective antennas of the transmitter have different transmission power, the receiver performs exact pilot estimation by multiplying pilot estimation values by reciprocals of the gain constants used in the transmitter. A gain constant $1/g_1$ (711) which is a reciprocal of the gain constant $g_1$ (451) multiplied by the signal transmitted through the first antenna 347, a gain constant $1/g_3$ (713) which is a reciprocal of the gain constant $g_2$ (453) multiplied by the signal transmitted through the second antenna 349, a gain constant $1/g_2$ (715) which is a reciprocal of the gain constant $g_3$ (455) multiplied by the signal transmitted through the third antenna 351, and a gain constant $1/g_4$ (717) which is a reciprocal of the gain constant $g_4$ (457) multiplied by the signal transmitted through the fourth antenna 353, are previously known to the receiver by pre-storing the gains in accordance with the transmitter, or provided to the UE by the transmitter as occasion demands. The receiver estimates exact pilot signals by multiplying pilot estimation values of the pilot signals received from the respective antennas by the associated gain constants. Processes other than the process for multiplying the reciprocals of the gain functions are the same as the processes described in FIG. 6, so the detailed description will not be given.

Figure 8:
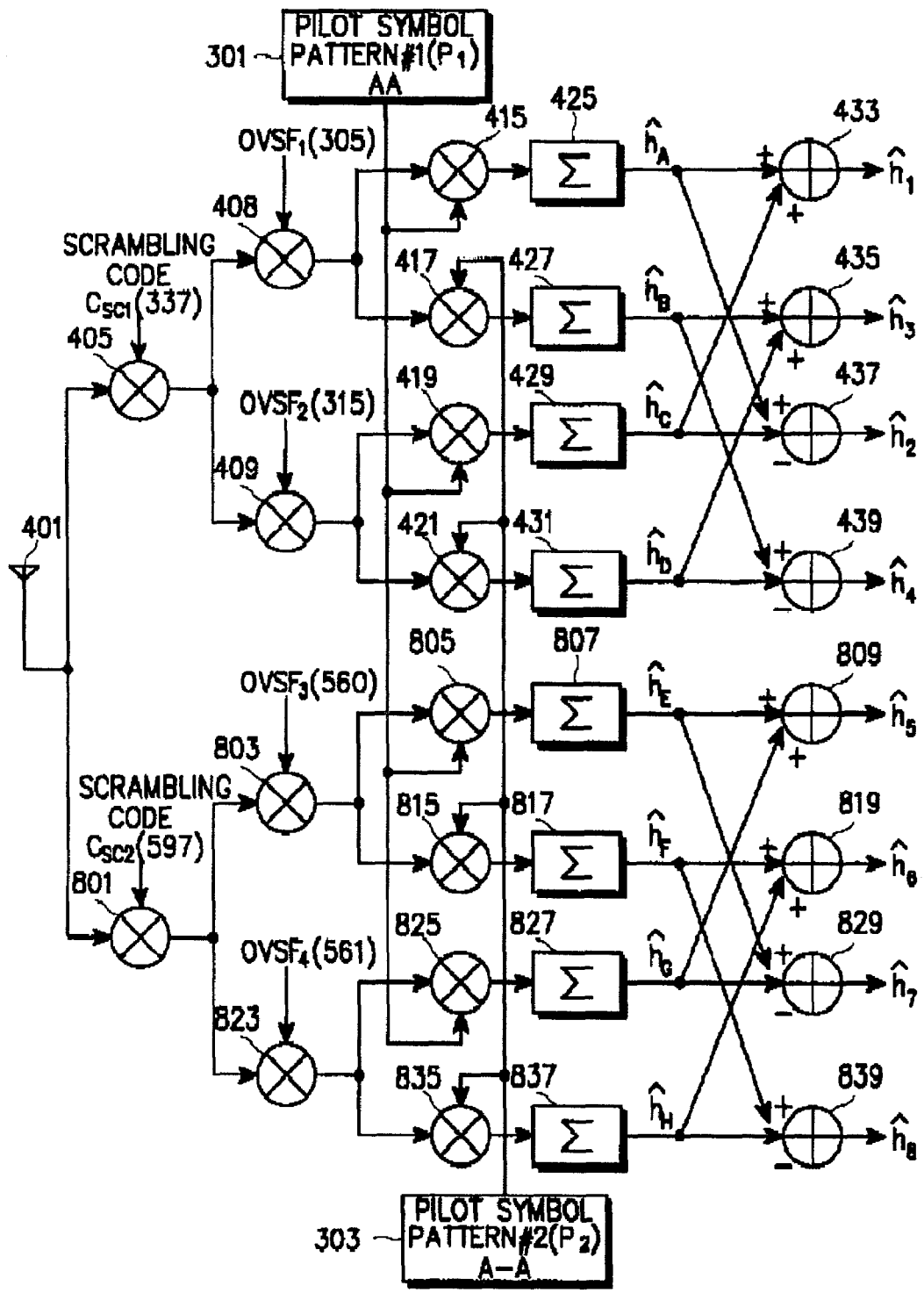
FIG. 8 illustrates a receiver structure supporting an eight-antenna transmit diversity according to another embodiment of the present invention.

Further, a receiver corresponding to a transmitter supporting a transmit diversity having antennas, the number of which is larger than four and is a multiple of four, e.g., the transmitter supporting the eight-antenna transmit diversity technique shown in FIG. 8, estimates the pilot symbols in the same manner as performed in the four-antenna transmit diversity method, using the new orthogonal codes or the new scrambling code used in the transmitter. A structure of the receiver corresponding to the transmitter employing the eight-antenna transmit diversity technique will be described with reference to FIG. 8.

FIG. 8 illustrates a receiver structure supporting an eight-antenna transmit diversity according to another embodiment of the present invention, wherein the eight-antenna transmit diversity is implemented by doubling the four-antenna transmit diversity in parallel. For estimation of the first 4 channels $\hat{h}_1$, $\hat{h}_2$, $\hat{h}_3$ and $\hat{h}_4$ of the signal received through the antenna 401 of the UE 203, the receiver primarily despreads the received signal using the first scrambling code $C_{SC1}$ (337) and then secondarily despreads the despread signal using the first and second orthogonal codes OVSF1 (305) and OVSF2 (315). The signals despread with the first and second orthogonal codes OVSF1 (305) and OVSF2 (315) are accumulated by their associated accumulators (not shown). Processes other than the process for despreading the first 4 channels $\hat{h}_1$, $\hat{h}_2$, $\hat{h}_3$ and $\hat{h}_4$ are the same as the processes performed in the receiver supporting the four-antenna transmit diversity shown in FIG. 6, so the detailed description will not be given. In addition, a process for controlling the gain constants, required to describe the receiver structure corresponding to the transmitter structure shown in FIG. 5, is also not described, for simplicity. If the transmitter controls transmission power of the respective antennas using the gain constants during transmission, the receiver requires an additional process for controlling output signals by multiplying the respective channel estimation values by reciprocals of the gain constants used for power control in the transmitter.

For pilot signal estimation on the next four channels $\hat{h}_5$, $\hat{h}_6$, $\hat{h}_7$ and $\hat{h}_8$ followed by the first four channels $\hat{h}_1$, $\hat{h}_2$, $\hat{h}_3$ and $\hat{h}_4$, the receiver primarily despreads the received signal using the second scrambling code $C_{SC2}$ (597) and then secondarily despreads the despread signal using the third and fourth orthogonal codes OVSF3 (560) and OVSF4 (561). The signals despread with the third and fourth orthogonal codes OVSF3 (560) and OVSF4 (561) are accumulated by their associated accumulators (not shown). Processes other than the process for despreading the next 4 channels $\hat{h}_5$, $\hat{h}_6$, $\hat{h}_7$ and $\hat{h}_8$ are the same as the processes performed in the receiver supporting the four-antenna transmit diversity shown in FIG. 6, so the detailed description will not be given. The gain constants are not considered during signal estimation on the channels $\hat{h}_5$, $\hat{h}_6$, $\hat{h}_7$ and $\hat{h}_8$. If, however, the transmitter controls transmission power of the respective antennas using the gain constants during transmission, the receiver requires an additional process for controlling output signals by multiplying the respective channel estimation values by reciprocals of the gain constants used for power control in the transmitter.

In addition, as described in FIG. 5, if the first scrambling code $C_{SC1}$ (337) is not identical to the second scrambling code $C_{SC2}$ (597), the first orthogonal code OVSF1 (305) is identical to the third orthogonal code OVSF3 (560) and the second orthogonal code OVSF2 (315) is also identical to the fourth orthogonal code OVSF4 (561). In contrast, if the first orthogonal code OVSF1 (305) is not identical to the third orthogonal code OVSF3 (560) and the second orthogonal code OVSF2 (315) is not identical to the fourth orthogonal code OVSF4 (561), then the first scrambling code $C_{SC1}$ (337) is identical to the second scrambling code $C_{SC2}$ (597). Therefore, when the number of antennas increases by four, the number of the required orthogonal codes also increases by two or one new scrambling code must be additionally used in the receiver corresponding to the transmitter employing the transmit diversity technique.

The transmit diversity system for transmitting and receiving the pilot symbol patterns according to the present invention has been described with reference to FIGS. 3 to 8. Next, a transmit diversity system for transmitting and receiving common data symbol patterns together with the pilot symbol patterns will be described with reference to FIGS. 9 to 12.

Figure 9:
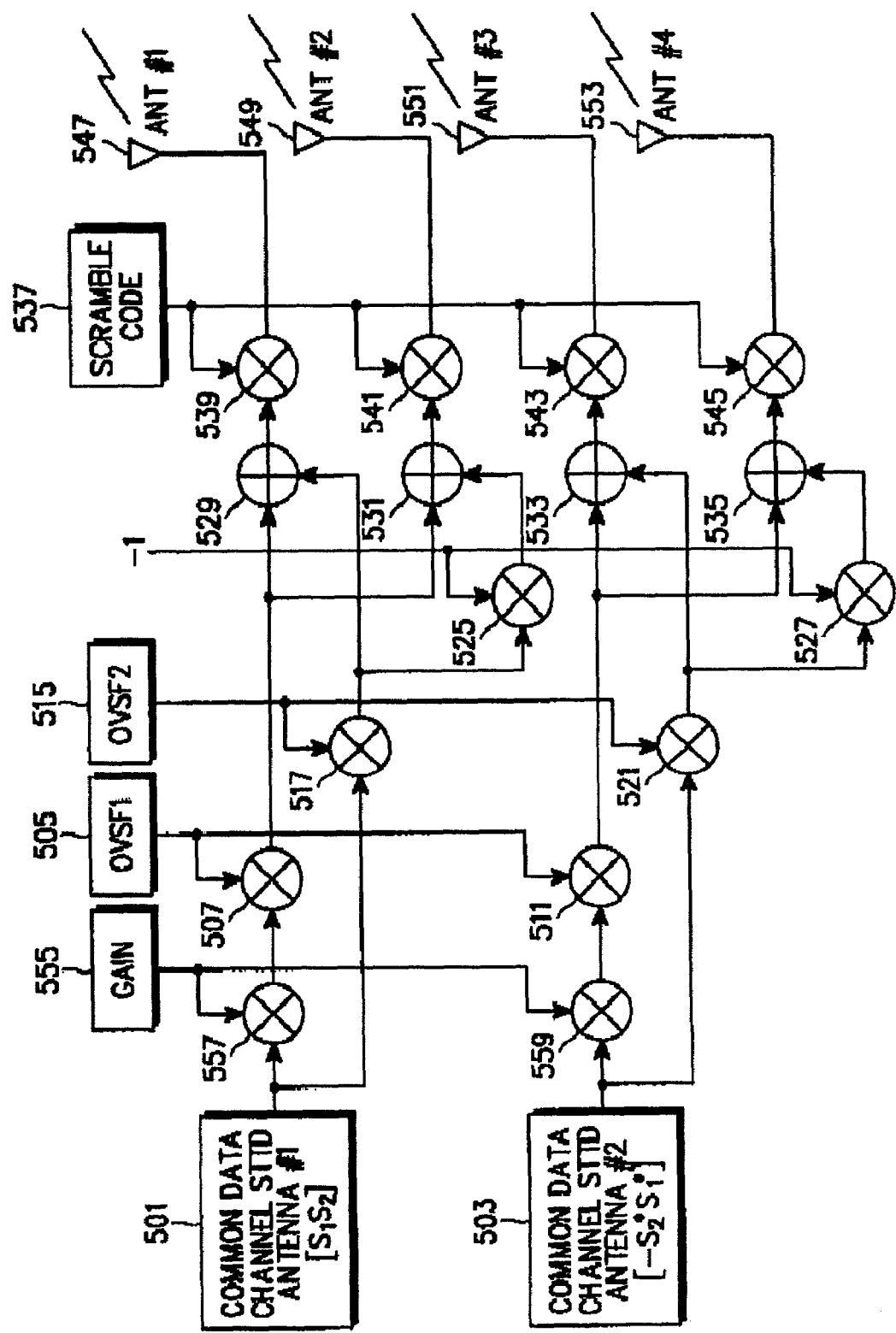
FIG. 9 illustrates a structure of a transmit diversity transmitter for transmitting common data according to another embodiment of the present invention.

FIG. 9 illustrates a structure of a transmit diversity transmitter for transmitting common data according to anther embodiment of the present invention. Respective data outputs of four antennas shown in FIG. 9 can be represented by Equations (9) to (12) below. Specifically, Equation (9) represents an output $y_1(t)$ of a first antenna 547 and Equation (10) represents an output $y_2(t)$ of a second antenna 549. Further, Equation (11) represents an output $y_3(t)$ of a third antenna 551 and Equation (12) represents an output $y_4(t)$ of a fourth antenna 553.

$$[y_1(2t)y_1(2t+1)] = [s(2t) \cdot C_{SC}(2t)s(2t+1) \cdot C_{SC}(2t+1)] \cdot (g \cdot C_{OVSF1}(2t) + C_{OVSF2}(2t)) \quad (9)$$

$$[y_2(2t)y_2(2t+1)] = [s(2t) \cdot C_{SC}(2t)s(2t+1) \cdot C_{SC}(2t+1)] \cdot (g \cdot C_{OVSF1}(2t) - C_{OVSF2}(2t)) \quad (10)$$

$$[y_3(2t)y_3(2t+1)] = [-s^*(2t+1) \cdot C_{SC}(2t)s^*(2t) \cdot C_{SC}(2t+1)] \cdot (g \cdot C_{OVSF1}(2t) + C_{OVSF2}(2t)) \quad (11)$$

$$[y_4(2t)y_4(2t+1)] = [-s^*(2t+1) \cdot C_{SC}(2t)s^*(2t) \cdot C_{SC}(2t+1)] \cdot (g \cdot C_{OVSF1}(2t) - C_{OVSF2}(2t)) \quad (12)$$

In Equations (9) to (12), [s(2t)s(2t+1)] indicates a 2-consecutive data symbol pattern 501, and [−s*(2t+1)s*(2t)] indicates a 2-consecutive diversity data symbol pattern 503 which is orthogonal with the 2-consecutive data symbol pattern 501. Further, $C_{OVSF1}(t)$ and $C_{OVSF2}(t)$ indicate a first orthogonal code OVSF1 (505) and a second orthogonal code OVSF2 (515), respectively, which are Walsh codes or OVSF (Orthogonal Variable Spreading Factor) codes. In addition, $C_{SC}(t)$ indicates a scrambling code 537, and 'g' indicates a gain constant 555 used to guarantee performance of the UE supporting the existing two-antenna transmit diversity technique.

A data signal 'A' to be transmitted in the four-antenna transmit diversity system may have a value of 1 or −1, when it is applied to a BPSK transmitter, and may have a value of {1+j, −1+j, 1−j, −1−j}, when it is applied to a QPSK transmitter. The data signal can also be applied to a transmitter supporting such high efficiency modulation as 8PSK (8-state Phase Shift Keying) modulation, 16 QAM (16-ary Quadrature Amplitude Modulation) modulation and 64 QAM (64-ary Quadrature Amplitude Modulation) modulation in the similar method. It will be assumed herein that the data signal 'A' is applied to an STTD (Space Time block coding based Transmit Diversity) technique which is one of open loop mode techniques among the above-stated transmit diversity techniques. The STTD considers a dedicate physical channel (DPCH), a primary common control physical channel (P_CCPCH), a secondary common control physical channel (S_CCPCH), a synchronization channel (SCH), a page indication channel (PICH), an acquisition indication channel (AICH), and a physical downlink shared channel (PDSCH), and calculates channel estimation values of the respective antennas for STT decoding using a common pilot channel (CPICH). In the case where the data signal 'A' has a format such that symbols $S_1$ and $S_2$ are sequentially received in transmit diversity encoding time intervals $T_1$ and $T_2$, respectively, the consecutive symbols $S_1S_2$, after being subjected to STTD encoding, are output as $S_1S_2$ through the first antenna and as $-S_2^*S_1^*$ through the second antenna.

Specifically describing the symbol STTD encoding in a channel bit unit, if it is assumed that the symbols $S_1$ and $S_2$ received in the transmit diversity encoding time intervals $T_1$ and $T_2$ as stated above are created as channel bits $b_0b_1$ and $b_2b_3$, respectively, then the symbols $S_1S_2$ are received as channel bits $b_0b_1b_2b_3$. By performing STTD encoding on the channel bits $b_0b_1b_2b_3$, the transmitter outputs channel bits $b_0b_1b_2b_3$ ($S_1S_2$) through the first antenna and outputs channel bits $-b_2b_3b_0-b_1$ ($-S_2^*S_1^*$) through the second antenna. Here, the first antenna is a reference antenna and the second antenna is a diversity antenna.

Among the data symbol patterns created through the STTD encoding, the symbols $S_1S_2$ transmitted through the first antenna being a reference antenna will be referred to as a "reference antenna STTD code block 501" and the symbols $-S_2^*S_1^*$ transmitted through the second antenna being a diversity antenna will be referred to as a "diversity antenna STTD code block 503". The reference antenna STTD code block 501 is multiplied by the gain constant g (555) by a multiplier 557, and then multiplied by the first orthogonal code 505 by a multiplier 507. For example, the first orthogonal code OVSF1 (505) has a chip rate of 256. Further, the reference antenna STTD code block 501 is multiplied by the second orthogonal code OVSF2 (515) by a multiplier 517. The output of the multiplier 517 is added to the output of the multiplier 507 by an adder 529, and then multiplied by the scrambling code 537 by a multiplier 539. The output signal of the multiplier 539 is transmitted through the first antenna 547. In addition, the reference antenna STTD code block 501 is multiplied by the gain constant g (555) by the multiplier 557 and then multiplied by the first orthogonal code OVSF1 (505) by the multiplier 507, and the resulting value is provided to an adder 531. Further, the reference antenna STTD code block 501 is multiplied by the second orthogonal code OVSF2 (515) by the multiplier 517 and then multiplied by a signal of −1 by a multiplier 525 for signal inversion, and the resulting value is provided to the adder 531. The adder 531 adds the output of the multiplier 507 to the output of the multiplier 525 and provides its output to a multiplier 541. The output of the adder 531 is multiplied by the scrambling code 537 by the multiplier 541 and then transmitted through the second antenna 549.

Similarly, the diversity antenna STTD code block 503 is multiplied by the gain constant 555 by a multiplier 559 and then multiplied by the first orthogonal code OVSF1 (505) by a multiplier 511, and the resulting value is provided to an adder 533. Further, the diversity antenna STTD code block 503 is multiplied by the second orthogonal code OVSF2 (515) by a multiplier 521, and then, provided to the adder 533. The adder 533 adds the output of the multiplier 511 to the output of the multiplier 521 and provides its output to a multiplier 543. The output of the adder 533 is multiplied by the scrambling code 537 by the multiplier 543 and then transmitted through the third antenna 551. Further, the diversity antenna STTD code block 503 is multiplied by the gain constant 555 by the multiplier 559 and then multiplied by the first orthogonal code OVSF1 (505) by the multiplier 511, and the resulting value is provided to an adder 535. Further, the diversity antenna STTD code block 503 is multiplied by the second orthogonal code OVSF2 (515) by the multiplier 521 and then multiplied by the signal of −1 by a multiplier 527 for signal inversion, and the resulting value is provided to the adder 535. The adder 535 adds the output of the multiplier 511 to the output of the multiplier 527 and provides its output to a multiplier 545. The output of the adder 535 is multiplied by the scrambling code 537 by the multiplier 545 and then transmitted through the fourth antenna 553. In the transmitter, the adders 529, 531, 533 and 535 can be united into a single adder. In addition, the multipliers 539, 541, 543 and 545 for multiplying their input signals by the scrambling code 537 can also be united into a single multiplier, and can also perform complex spreading. The multipliers 525 and 527 for inverting their input signals by multiplying them by the signal of −1 can be put in other places as long as the signals to be output through the second and fourth antennas 549 and 553 are subjected to phase inversion. For example, the multiplier 525 can be arranged in front of the multiplier 517 to invert the input data symbol pattern 501 or the input OVSF code 515. In addition, it is also possible to remove the multiplier 525. In this case, the adder 531 must subtract the output signal of the multiplier 517 from the output signal of the multiplier 507. In the same manner, the multiplier 527 can be arranged in front of the multiplier 521 to invert the input data symbol pattern 503 or the input OVSF code 515. In addition, it is also possible to remove the multiplier 527. In this case, the adder 535 must subtract the output signal of the multiplier 521 from the output signal of the multiplier 511. If the gain constant 555 is g=1, it is not included in the hardware structure. In addition, the gain constant 555 has a constant value or a variable value which can be adaptively controlled in a symbol unit according to a channel environment or a user environment.

The four-antenna transmit diversity transmitter for transmitting the common channel data symbols using two orthogonal codes has been described with reference to FIG. 9. A simplified four-antenna transmit diversity transmitter for transmitting the common channel data symbols using a single orthogonal code will be described with reference to FIG. 10.

Figure 10:
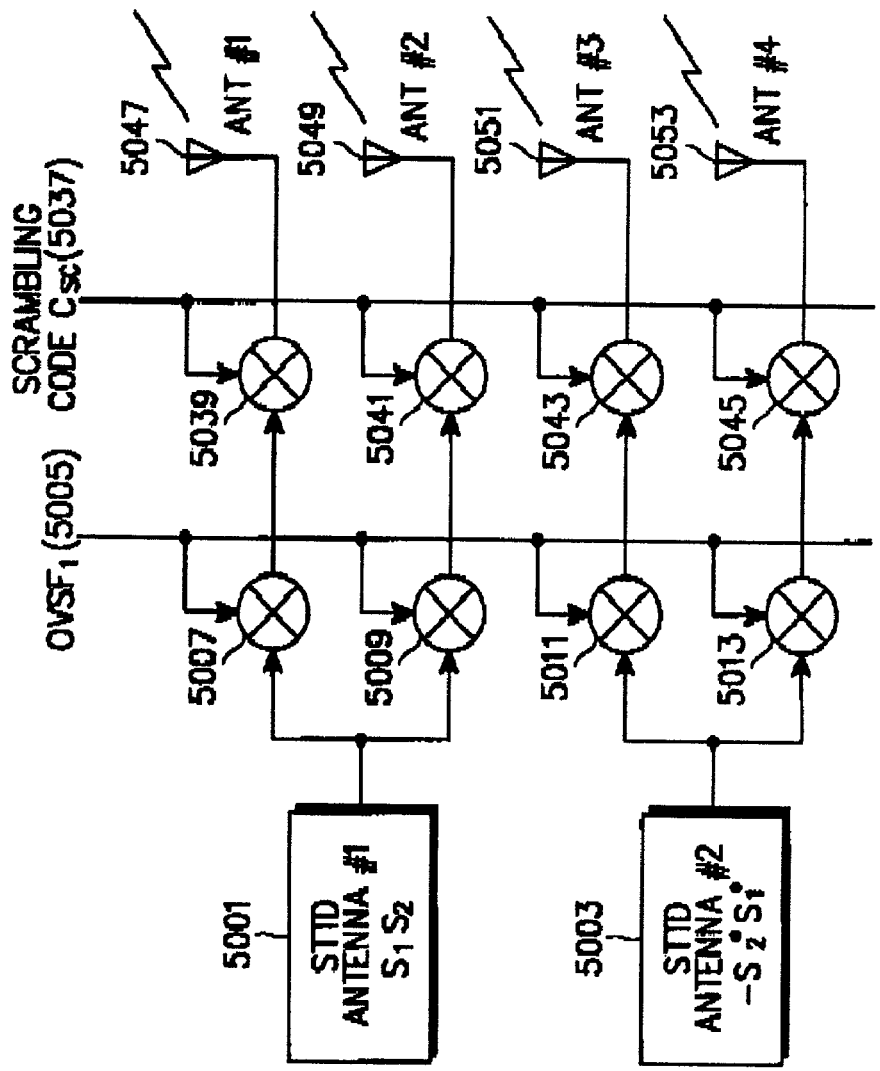
FIG. 10 illustrates a structure of a transmit diversity transmitter for transmitting common channel data using a single orthogonal code according to another embodiment of the present invention.

FIG. 10 illustrates a structure of a transmit diversity transmitter for transmitting common channel data using a single orthogonal code according to another embodiment of the present invention. In FIG. 10, among the data symbol patterns created through the STTD encoding, the symbols $S_1S_2$ transmitted through first and second antennas 5047 and 5049 serving as reference antennas will be referred to as a "reference antenna STTD code block 5001" and the symbols $-S_2^*S_1^*$ transmitted through third and fourth antennas 5051 and 5053 serving as diversity antennas will be referred to as a "diversity antenna STTD code block 5003". The reference antenna STTD code block 5001 is multiplied by a first orthogonal code OVSF1 (5005) by a multiplier 5007, and then multiplied by a scrambling code $C_{SC}$ (5037) by a multiplier 5039, and the resulting value is transmitted through the first antenna 5047. For example, the first orthogonal code OVSF1 (5005) has a chip rate of 256. In the same manner, the reference antenna STTD code block 5001 is multiplied by the first orthogonal code OVSF1 (5005) by a multiplier 5009, and then multiplied by the scrambling code $C_{SC}$ (5037) by a multiplier 5041, and the resulting value is transmitted through the second antenna 5049.

Further, the diversity antenna STTD code block 5003 is multiplied by the first orthogonal code OVSF1 (5005) by a multiplier 5011, and then multiplied by the scrambling code $C_{SC}$ (5037) by a multiplier 5043, and the resulting value is transmitted through the third antenna 5051. In the same manner, the diversity antenna STTD code block 5003 is multiplied by the first orthogonal code OVSF1 (5005) by a multiplier 5013, and then multiplied by the scrambling code $C_{SC}$ (5037) by a multiplier 5045, and the resulting value is transmitted through the fourth antenna 5053.

Figure 11:
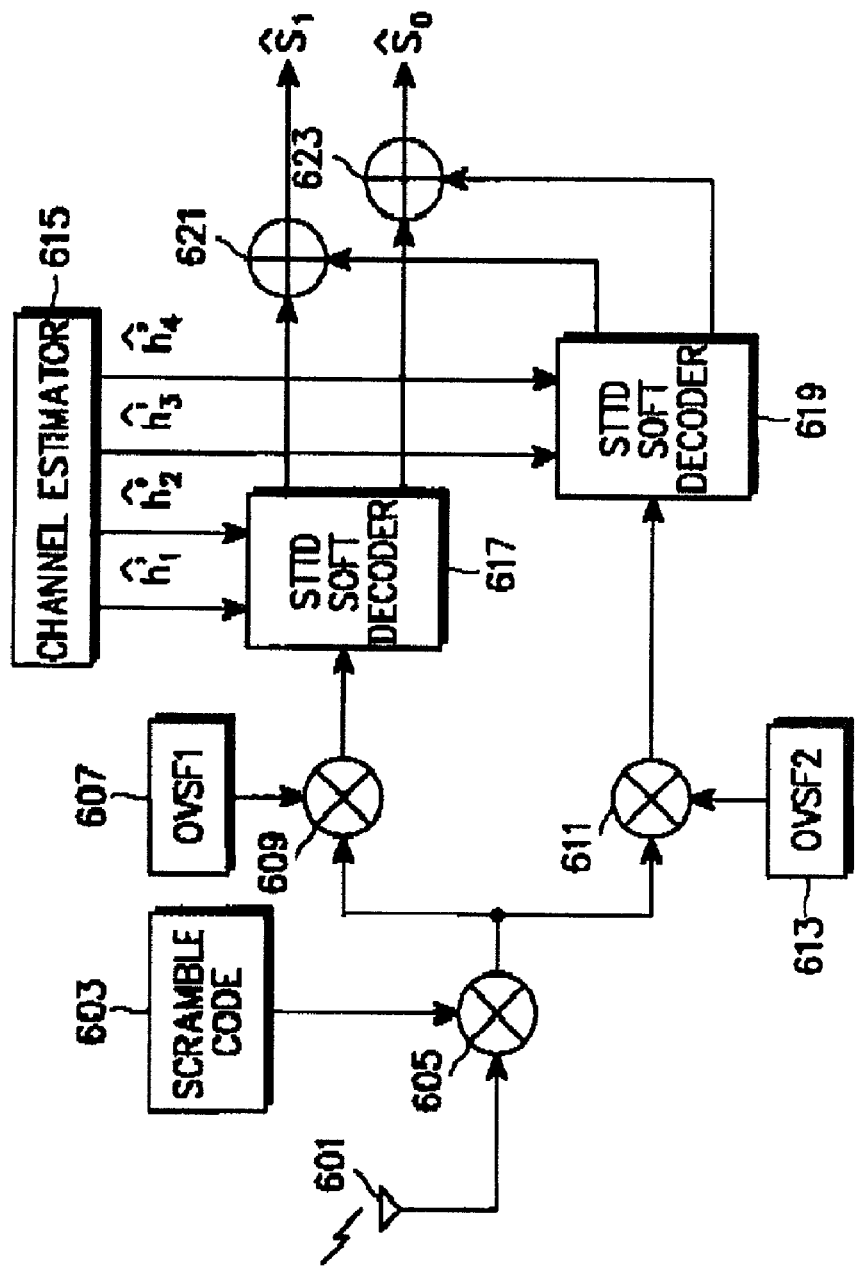
FIG. 11 illustrates a structure of a transmit diversity receiver for estimating common channel data using two orthogonal codes according to another embodiment of the present invention.

Next, a receiver structure corresponding to the transmitter structure shown in FIG. 9 will be described with reference to FIG. 11. FIG. 11 illustrates a structure of a transmit diversity receiver for estimating common data according to another embodiment of the present invention. Two output signals shown in FIG. 11 can be represented by Equations (13) to (14) below. Specifically, Equation (13) represents a first data symbol detection value $\hat{s}_1$, and Equation (14) represents a second data symbol detection value $\hat{s}_2$.

$$\hat{s}_1 = \hat{s}_{11} + \hat{s}_{21} \tag{13}$$

$$\hat{s}_2 = \hat{s}_{12} + \hat{s}_{22} \tag{14}$$

In Equations (13) and (14), $\hat{s}_{11}$ and $\hat{s}_{12}$ indicate output signals of a first STTD soft decoder 617, and $\hat{s}_{21}$ and $\hat{s}_{12}$ indicate output signals of a second STTD soft decoder 619.

A signal received at an antenna 601 of the UE 203 is provided to a despreader 605 after it is converted to a baseband signal, and then, despread there with a scrambling code 603. The signal despread by the despreader 605 is provided in common to an orthogonal despreader 609 and an orthogonal despreader 611. The orthogonal despreader 609 despreads the signal output from the despreader 605 using a first orthogonal code OVSF1 (607) and the orthogonal despreader 611 despreads the signal output from the despreader 605 using a second orthogonal code OVSF2 (613). The signal despread with the first orthogonal code OVSF1 is subjected to soft detection by the STTD soft decoder 617 using the leading two symbols of a channel estimation value output from a channel estimator 615, and the two resulting values are provided to adders 621 and 623, respectively. The signal despread with the second orthogonal code OVSF2 is subjected to soft detection by the STTD soft decoder 619 using the following two symbols of the channel estimation value output from the channel estimator 615, and the two resulting values are provided to the adders 621 and 623, respectively. An added value by the adder 621 is output as a first data detection value, and an added value by the adder 623 is output as a second data detection value. When the gain constant g (355) of the pilot channel is not identical to the gain constant g (555) of the common data channel, the STTD soft decoder 617 is constructed such that its output value is multiplied by a ratio of (gain constant g (555))/(gain constant g (355)) before it is added to the output of the STTD soft decoder 619 by the adder 621. Likewise, the STTD soft decoder 617 is constructed such that its output value is multiplied by a ratio of (gain constant g (555))/(gain constant g (355)) before it is added to the output of the STTD soft decoder 619 by the adder 623.

The structure of the transmit diversity receiver for estimating the common channel data using 2 orthogonal codes has been described with reference to FIG. 11. Next, a transmit diversity receiver structure for common data estimation, which corresponds to the transmitter structure, shown in FIG. 10, using a single orthogonal code will be described with reference to FIG. 12.

Figure 12:
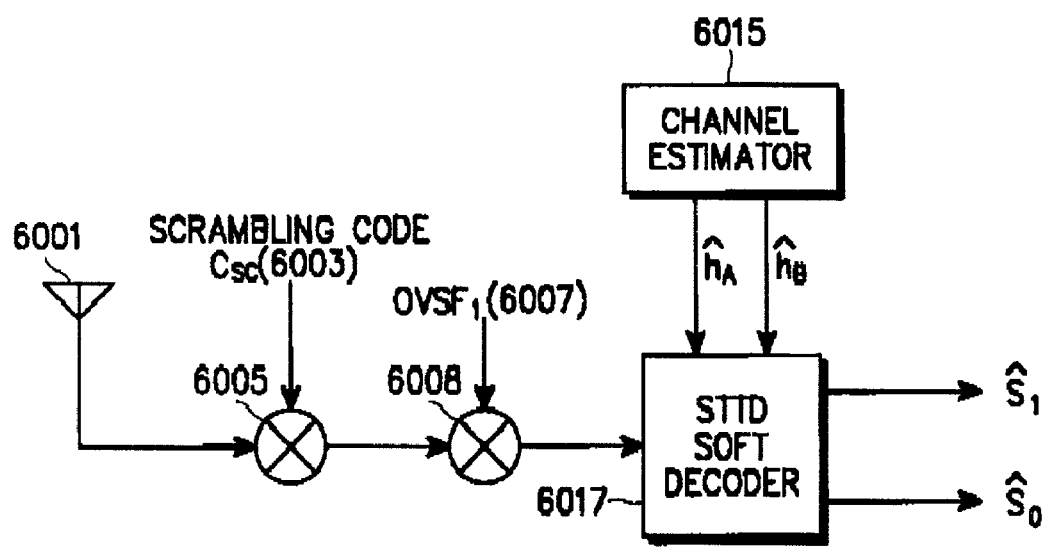
FIG. 12 illustrates a structure of a transmit diversity receiver for estimating common data using a single orthogonal code according to another embodiment of the present invention.

FIG. 12 illustrates a structure of a transmit diversity receiver for estimating common data using a single orthogonal code according to another embodiment of the present invention. A signal received at an antenna 6001 of the UE 203 is provided to a despreader 6005 after it is converted to a baseband signal, and then despread there with a scrambling code $C_{SC}$ (6003). The signal despread by the despreader 6005 is orthogonal-despread with a first orthogonal code OSVF1 (6007) by an orthogonal despreader 6008. The orthogonal despread signal is provided to an STTD soft decoder 6017, which soft-detects the orthogonal despread signal using leading 2 symbols $\hat{h}_A$ and $\hat{h}_B$ of a channel estimation signal output from a channel estimator 6015, and outputs the two resulting values as data detection values $\hat{s}_1$ and $\hat{s}_2$.

Now, an operation of the invention will be described in detail with reference to the accompanying drawings.

In general, the transmit antenna diversity system refers to a system which transmits information through a plurality of antennas, so that even if information received from a specific one of the antennas is damaged, the receiver can receive the information through the other antennas, thus increasing transmission efficiency. Therefore, in such a transmit antenna diversity system, the UE creates weights for maximal ratio combining by measuring the antennas. As stated above, the closed loop mode is used to feed back the created weights to the UTRAN so that the UTRAN can assigns the weights, and the open loop mode is used to combine the respective antenna signals received at the UE, using the created weights. The characteristics of the transmit antenna diversity system depend upon the number of the antennas applied for the diversity. For example, the system may have two or four or more antennas to implement the transmit diversity.

However, when a UE operating in a two-antenna transmit diversity mode enters a service area of a UTRAN system supporting a four-antenna transmit diversity having first to fourth antennas, the UTRAN system pairs the first and second antennas and pairs the third and fourth antennas through signal processing so as to operate as if it provides the service using two antennas. Meanwhile, when a UE supporting a four-antenna transmit diversity enters the service area of the UTRAN system, the UTRAN system normally supports the four-antenna transmit diversity by transmitting signals through the respective antennas.

A W-CDMA UTRAN supporting the two-antenna transmit diversity assigns two orthogonal pilot symbol patterns to the respective antennas, so that the UE can measure the two different antenna channels. The UE measures the first antenna channel using the first orthogonal symbol pattern out of the two orthogonal symbol patterns, and measures the second antenna channel using the second orthogonal symbol pattern. However, the four-antenna transmit diversity UTRAN transmits the pilot signals such that the four antenna channels can be separated. In order to enable the UE supporting the two-antenna transmit diversity to operate without modification and to uniformly distribute the signal power to the four antennas for the two-antennas diversity, the first and second antennas are paired to make an effective antenna A and the third and fourth antennas are paired to make an effective antenna B, as shown in FIG. 2. Although there are several methods for pairing (grouping) the two antennas through signal processing, a method for transmitting the same signal through the two antennas is typically used. The UE supporting the two-antenna diversity considers that the signals are received through two antennas, i.e., the effective antenna A and the effective antenna B.

If a channel of the first antenna is represented by $h_1$, a channel of the second antenna is represented by $h_2$, a channel of the third antenna is represented by $h_3$ and a channel of the fourth antenna is represented by $h_4$, then a channel of the effective channel A is represented by $h_A = h_1 + h_2$, and a channel of the effective channel B is represented by $h_B = h_3 + h_4$. It is assumed that in light of the characteristic of the diversity channel, the channel $h_A$ and the channel $h_B$ have the same characteristics as the diversity channels of the two-antenna transmit diversity. Accordingly, a UE for the four-antenna diversity system performs the diversity using the 4 channels of $h_1$, $h_2$, $h_3$ and $h_4$, and a UE for the two-antenna diversity system performs the diversity using the two channels of $h_A$ and $h_B$.

There are several methods for enabling the UE for the two-antenna transmit diversity to perform the diversity using the effective antenna A and the effective antenna B in the service area of the UTRAN supporting the four-antenna transmit diversity. A typically method is to transmit a first same signal through the first and second antennas for the data to be transmitted through the effective antenna A, and also transmit a second same signal through the third and fourth antennas for the data o be transmitted through the effective antenna B.

In case of the two-antenna STTD which is a kind of an open loop transmit diversity, when providing the service with four antennas, the UTRAN transmits the original data through the effective antenna A, i.e., the first and second antennas, and transmits the diversity data through the effective antenna B, i.e., the third and fourth antennas, for the UE supporting the two-antenna transmit diversity. In case of two-antenna TxAA (Transmit Antenna Array) which is a kind of the closed loop transmit diversity, the UTRAN transmits a signal obtained by multiplying transmission data by a first weight through the effective antenna A, i.e., the first and second antennas, and transmits a signal obtained by multiplying transmission data by a second weight through the effective antenna B, i.e., the third and fourth antennas.

The two-antenna diversity UE must measure the channel $h_A$ obtained by adding $h_1$ and $h_2$, and the channel $h_B$ obtained by adding $h_3$ and $h_4$, so that the UTRAN pairs the channels by two when transmitting the pilot symbol patterns. Table 1 below shows a pilot transmission standard for two antennas in the four-antenna transmit diversity system. When the UTRAN transmits the pilot symbol patterns as shown in Table 1, the UE obtains the paired channels. The pilot symbol patterns are orthogonal pilot symbol patterns used to distinguish the antennas. The orthogonal symbol patterns are created with Walsh codes. In the W-CDMA system, the pilot signals are transmitted over a common pilot channel (CPICH), which has a unique channelization code. The UE measures the channel $h_A$ obtained by adding $h_1$ and $h_2$ by correlating the signal received through the common pilot channel with a pattern #1, and measures the channel $h_B$ obtained by adding $h_3$ and $h_4$ by correlating the received signal with a pattern #2.

TABLE 1

| Antenna Number | Antenna #1 | Antenna #2 | Antenna #3 | Antenna #4 |
|---|---|---|---|---|
| Channel | h1 | h2 | h3 | h4 |
| Pilot Symbol Pattern | Pattern #1 | Pattern #1 | Pattern #2 | Pattern #2 |

A four-antenna transmit diversity UTRAN compatible with a UE for the two-antenna transmit diversity uses an additional common pilot channel for channel measurement by a UE for the four-antenna transmit diversity. Herein, the existing common pilot channel will be referred to as a "first common pilot channel", while the additional common pilot channel will be referred to as a "second common pilot channel." The four-antenna transmit diversity should measure all of the four antenna channels $h_1$, $h_2$, $h_3$ and $h_4$. If the four-antenna transmit diversity system of Table 1 transmits the pilot signals in accordance with a standard of Table 2 including the pilot transmission standard for the two-antenna transmit diversity, four antenna channels are obtained by linearly combining a measured result of the first common pilot channel with a measured result of the second common pilot channel. When the first common pilot channel is received, a channel $h_A=h_1+h_2$ and a channel $h_B=h_3+h_4$ are obtained. When the second common pilot channel is received, a channel $h_C=h_1-h_2$ and a channel $h_D=h_3-h_4$ are obtained. Table 2 below shows a pilot transmission standard for two antennas in the four-antenna transmit diversity system.

TABLE 2

| Antenna Number | Antenna #1 | | | | Antenna #2 | | | | Antenna #3 | | | | Antenna #4 | | | |
|---|---|---|---|---|---|---|---|---|---|---|---|---|---|---|---|---|
| Channel | h1 | | | | h2 | | | | h3 | | | | h4 | | | |
| Pilot Symbol Pattern | #1 | #1 | #1 | −#1 | #2 | #2 | #2 | −#2 | | | | | | | | |
| CPICH | #1 | #2 | #1 | #2 | #1 | #2 | #1 | #2 | | | | | | | | |

To be compatible with the two-antenna transmit diversity UE, the four-antenna transmit diversity UTRAN groups the four antennas by two to transmit the signals through 2 effective antennas. The UE for the four-antenna transmit diversity performs the diversity with four antenna channels. In order to enable the UE for the two-antenna transmit diversity to operate as if it has two channels in the same method as the existing method, the UTRAN system transmits the pilot symbol patterns according to the transmission standard of Table 2, using the first common pilot channel and the second common pilot channel. Thus, the UE for the four-antenna transmit diversity measures four antenna channels through linear combination of the pilots.

In addition, in the W-CDMA system, common data is transmitted over common data channels (CDCHs). The common data channels have unique channelization codes and detect estimated data symbols for the transmitted symbols by STTD decoding the signal received over the common data channels, using an estimated value of the channel $h_A$ obtained by adding $h_1$ and $h_2$ and an estimated value of the channel $h_B$ obtained by adding $h_3$ and $h_4$. Table 3 below shows a common data transmission standard for two antennas in the four-antenna transmit diversity system.

TABLE 3

| Antenna Number | Antenna #1 | Antenna #2 | Antenna #3 | Antenna #4 |
|---|---|---|---|---|
| Channel | h1 | h2 | h3 | h4 |
| STTD Code Block | Reference Antenna Block | Reference Antenna Block | Diversity Antenna Block | Diversity Antenna Block |
| Channelization Code | #3 | #3 | #3 | #3 |

A four-antenna transmit diversity UTRAN compatible with a UE for the two-antenna transmit diversity uses an additional common data channel for channel measurement by a UE for the four-antenna transmit diversity. Herein, the existing common data channel will be referred to as a "first common data channel", while the additional common data channel will be referred to as a "second common data channel." The four-antenna transmit diversity should measure all of the four antenna channels $h_1$, $h_2$, $h_3$ and $h_4$. If the data signals are transmitted in accordance with a standard of Table 4 configured including the transmission standard of Table 3, a transmission symbol estimation value is calculated by linearly combining a measured result of the first common data channel with a measured result of the second common data channel. The received first common data channel is restored to the transmitted symbol using an $h_A=h_1+h_2$ channel estimation value and an $h_B=h_3+h_4$ channel estimation value. The received second common data channel is restored to the transmitted symbol using an $h_C=h_1-h_2$ channel estimation value and an $h_D=h_3-h_4$ channel estimation value. Herein, please note that #3 is only one of several OVSF CODEs, which is different from #1 or #2 in table 4.

Table 4 below shows a common data transmission standard for 2 antennas in the four-antenna transmit diversity system.

TABLE 4

| Antenna Number | Antenna #1 | | | | Antenna #2 | | | | Antenna #3 | | | | Antenna #4 | | | |
|---|---|---|---|---|---|---|---|---|---|---|---|---|---|---|---|---|
| Channel | h1 | | | | h2 | | | | h3 | | | | h4 | | | |
| Common Data Symbol (STTD) | #1 | #1 | #1 | −#1 | #2 | #2 | #2 | −#2 | | | | | | | | |
| Channelization Code | #1 | #2 | #1 | #2 | #1 | #2 | #1 | #2 | | | | | | | | |

In Table 4, #1 denotes a reference antenna coding block and #2 denotes a diversity antenna coding block.

When using the transmitter of FIG. 10 and the receiver of FIG. 12, the diversity system requires only one channelization code. Thus, the common data channels received at the receiver are restored to the common data symbols transmitted from the transmitter using the $h_A=h_1+h_2$ channel estimation value and the $h_B=h_3+h_4$ channel estimation value.

To be compatible with a UE for the two-antenna transmit diversity, the four-antenna transmit diversity UTRAN groups the four antennas by two to transmit the signals through two effective antennas. The UE for the four-antenna transmit diversity performs the diversity with four antenna channels. In order to enable the UE for the two-antenna transmit diversity to operate as if it has two channels in the same method as the existing method, the UTRAN transmits the common data according to the transmission standard of Table 3, using the two common data channels. The UE for the four-antenna transmit diversity detects the signals in the four-antenna diversity mode, using the received common data signals.

With reference to FIGS. 9 and 11, the transmit diversity system has been described which transmits and receives the common data symbol patterns as well as the pilot symbol patterns according to the present invention. In addition, the transmit diversity system for transmitting and receiving fixed physical channel symbol patterns through the open loop mode (STTD) can also be implemented in the same method as described in FIGS. 10 and 12.

As described above, when a UE using a transmit diversity technique whose antennas is different in number from the antennas of the transmit diversity technique supported by the UTRAN enters a service area of the UTRAN, the invention can uniformly distribute the transmission power to the respective antennas by maintaining compatibility between the different diversity techniques.

For example, if the UTRAN can service a maximum of 100 users, the UTRAN processes 100/4 or 25 units of power per antenna for the four-antenna transmit diversity UE, and processes 100/2 or 50 units of power for the two-antenna transmit diversity UE. In accordance with the invention, however, the UTRAN may process a maximum of 100/4 power even for the two-antenna transmit diversity UE, thus making it possible to avoid using the expensive RF element such as a power amplifier.

In addition, even in the case where there coexist a UE for the two-antenna transmit diversity and a UE for the four-antenna transmit diversity, the system employing the four-antenna transmit diversity technique supports the pilot symbol pattern transmission so that the UE for the four-antenna transmit diversity measures four channels, and the UE for the two-antenna transmit diversity measures two channels. Therefore, the UE for the two-antenna transmit diversity does not require an additional channel measurement device, and the UE for the four-antenna transmit diversity has the minimized number of the channel measurement device.

Further, for the common data, the transmit diversity system has an effect of the four-antenna transmit diversity and is compatible with the UE for the two-antenna transmit diversity.

Moreover, it is possible to implement a transmit diversity transmitter having antennas, the number of which is over four, e.g., a multiple of four, by separately applying the orthogonal code and the scrambling code to the four-antenna transmit diversity. In addition, it is possible to implement a transmit diversity system having various numbers of antennas as well as a transmit diversity system having the antennas, the number of which is a multiple of four, by limiting signal transmission through a specific antenna.

In addition, by controlling transmission power of the respective antennas, it is possible to control the cell radiuses for the pilot signals to be identical regarding a receiver employing a one-antenna transmit diversity, a receiver employing a two-antenna transmit diversity, a receiver employing a four-antenna transmit diversity and a receiver employing a transmit diversity having a different number of antennas.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A UTRAN (UMTS (Universal Mobile Telecommunication System) Terrestrial Radio Access Network) transmitter in a mobile communication system having at least four antennas, comprising:
    a first adder connected to a first antenna that adds a first spread signal, obtained by spreading a first symbol pattern with a first orthogonal code, to a second spread signal obtained by spreading the first symbol pattern with a second orthogonal code;
    a second adder connected to a second antenna that adds the first spread signal to a third spread signal obtained by spreading a first inverted symbol pattern obtained by phase-inverting the first symbol pattern with the second symbol pattern;
    a third adder connected to a third antenna that adds a fourth spread signal, obtained by spreading a second symbol pattern being orthogonal with the first symbol pattern with the first orthogonal code, to a fifth spread signal obtained by spreading the second symbol pattern with the second orthogonal code;
    a fourth adder connected to a fourth antenna that adds the fourth spread signal to a sixth spread signal obtained by spreading a second inverted symbol pattern obtained by phase-inverting the second symbol pattern with the second orthogonal code;
    a fifth adder connected to a fifth antenna that adds a seventh spread signal obtained by spreading the first symbol pattern with a third orthogonal code, to an eighth spread signal obtained by spreading the first symbol pattern with a fourth orthogonal code;
    a sixth adder connected to a sixth antenna that adds the seventh spread signal to a ninth spread signal obtained by spreading the first inverted symbol pattern with the fourth orthogonal code;
    a seventh adder connected to a seventh antenna that adds a tenth spread signal, obtained by spreading the second symbol pattern with the third orthogonal code, to an eleventh spread signal obtained by spreading the second symbol pattern with the fourth orthogonal code; and
    an eighth adder connected to an eighth antenna that adds the tenth spread signal to a twelfth spread signal obtained by spreading the second inverted symbol pattern with the fourth orthogonal code.

2. The UTRAN transmitter as claimed in claim 1, wherein the first orthogonal code is different from the third orthogonal code and the second orthogonal code is different from the fourth orthogonal code.

3. The UTRAN transmitter as claimed in claim 1, wherein when the first orthogonal code is identical to the third orthogonal code and the second orthogonal code is identical to the fourth orthogonal code, then a first scrambling code applied to output signals of the first to fourth antennas is set to be different from a second scrambling code applied to output signals of the fifth to eighth antennas.

4. The UTRAN transmitter as claimed in claim 1, wherein the transmitter selects only the number of antenna's transmission of specific signals among the output signals of the first to eighth antennas, when the number of antennas is less than eight.

5. The UTRAN transmitter as claimed in claim 1, wherein each of the symbol pattern is one of a pilot symbol pattern and a data symbol pattern.

6. A data transmission method in a UTRAN (UMTS (Universal Mobile Telecommunication System) Terrestrial Radio Access Network) transmitter for a mobile communication system having at least four antennas, comprising the steps of:
    adding a first spread signal, obtained by spreading a first symbol pattern with a first orthogonal code, to a second spread signal, obtained by spreading the first symbol pattern with a second orthogonal code, to generate a first added signal and transmitting the first added signal through a first antenna;
    adding the first spread signal to a third spread signal obtained by spreading a first inverted symbol pattern obtained by phase-inverting the first symbol pattern with the second orthogonal code, to generate a second added signal and transmitting the second added signal through a second antenna;
    adding a fourth spread signal obtained by spreading a second symbol pattern, being orthogonal with the first symbol pattern with the first orthogonal code, to a fifth spread signal, obtained by spreading the second symbol pattern with the second orthogonal code, to generate a third added signal and transmitting the third added signal through a third antenna;
    adding the fourth spread signal to a sixth spread signal obtained by spreading a second inverted symbol pattern obtained by phase-inverting the second symbol pattern with the second orthogonal code, to generate a fourth added signal and transmitting the fourth added signal through a fourth antenna;
    adding a seventh spread signal, obtained by spreading the first symbol pattern with a third orthogonal code, to an eighth spread signal, obtained by spreading the first symbol pattern with a fourth orthogonal code, to generate a fifth added signal and transmitting the fifth added signal through a fifth antenna;

adding the seventh spread signal to a ninth spread signal obtained by spreading the first inverted symbol pattern with the fourth orthogonal code, to generate a sixth added signal and transmitting the sixth added signal through a sixth antenna;

adding a tenth spread signal, obtained by spreading the second symbol pattern with the third orthogonal code, to an eleventh spread signal, obtained by spreading the second symbol pattern with the fourth orthogonal code, to generate a seventh added signal and transmitting the seventh added signal through a seventh antenna; and adding the tenth spread signal to a twelfth spread signal obtained by spreading the second inverted symbol pattern with the fourth orthogonal code, to generate a eighth added signal and transmitting the eighth added signal through an eighth antenna.

7. The data transmission method as claimed in claim 6, wherein the first orthogonal code is different from the third orthogonal code and the second orthogonal code is different from the fourth orthogonal code.

8. The data transmission method as claimed in claim 6, wherein when the first orthogonal code is identical to the third orthogonal code and the second orthogonal code is identical to the fourth orthogonal code, then a first scrambling code applied to output signals of the first to fourth antennas is different from a second scrambling code applied to output signals of the fifth to eighth antennas.

9. The data transmission method as claimed in claim 6, further comprising the step of controlling transmission of specific signals among the output signals of the first to eighth antennas when the number of antennas is less than eight.

10. A UE (User Equipment) receiver in a mobile communication system, wherein the UE receiver receives signals transmitted from a UTRAN transmitter supporting a transmit diversity technique having at least four antennas, comprising:

a plurality of despreaders for generating a first despread signal despread using a first orthogonal code and a first symbol pattern of the received signals, generating a second despread signal despread using the first orthogonal code and a second symbol pattern being orthogonal with the first symbol pattern, generating a third despread signal dispred using a second orthogonal code being orthogonal with the first orthogonal code and the first symbol pattern, generating a fourth despread signal despread using the second orthogonal code and the second symbol pattern, generating a fifth despread signal despread using a third orthogonal code and the first symbol pattern, generating a sixth despread signal despread using the third orthogonal code and the second symbol pattern, generating a seventh despread signal despread using a fourth orthogonal code and the first symbol pattern, and generating an eighth despread signal despread using the fourth orthogonal code and the second symbol pattern; and a plurality of adders for generating a first channel estimation signal by adding the first despread signal to the third despread signal, generating a second channel estimation signal by adding the second despread signal to the fourth despread signal, generating a third channel estimation signal by subtracting the third despread signal from the first despread signal, generating a fourth channel estimation signal by subtracting the fourth despread signal from the second despread signal, generating a fifth channel estimation signal by adding the fifth spread signal to the seventh despread signal, generating a sixth channel estimation signal by adding the sixth despread signal to the eighth despread signal, generating a seventh channel estimation signal by subtracting the seventh despread signal from the fifth despread signal, and generating an eighth channel estimation signal by subtracting the eighth despread signal from the sixth despread signal.

11. The UE receiver as claimed in claim 10, wherein the symbol pattern is one of a pilot symbol pattern and a data symbol pattern.

12. A data reception method in a UE (User Equipment) receiver for a mobile communication system, wherein the UE receiver receives signals transmitted from a UTRAN transmitter supporting a transmit diversity technique having at least four antennas, comprising the steps of:

despreading the received signals into a first despread signal using a first orthogonal code and a first symbol pattern, despreading the received signals into a second despread signal using the first orthogonal code and a second symbol pattern being orthogonal with the first symbol pattern, despreading the received signals into a third despread signal using the second orthogonal code and the first symbol pattern, despreading the received signal into a fourth despread signal using the second orthogonal code and the second symbol pattern, despreading the received signals into a fifth despread signal using a third orthogonal code and the first symbol pattern, despreading the received signals into a sixth despread signal using the third orthogonal code and the second symbol pattern, despreading the received signal into a seventh despread signal using a fourth orthogonal code and the first symbol pattern, and despreading the received signals into an eighth despread signal using the fourth orthogonal code and the second symbol pattern; and estimating a first channel signal by adding the first despread signal to the third despread signal, estimating a second channel signal by adding the second despread signal to the fourth despread signal, estimating a third channel signal by subtracting the third despread signal from the first despread signal, estimating a fourth channel signal by subtracting the fourth despread signal from the second despread signal, estimating a fifth channel signal by adding the fifth spread signal to the seventh despread signal, estimating a sixth channel signal by adding the sixth despread signal to the eighth despread signal, estimating a seventh channel signal by subtracting the seventh despread signal from the fifth despread signal, and estimating an eighth channel signal by subtracting the eighth despread signal from the sixth despread signal.

13. The data reception method as claimed in claim 12, wherein the symbol pattern is one of a pilot symbol pattern and a data symbol pattern.

* * * * *